US011362494B2

(12) United States Patent
Kreiger et al.

(10) Patent No.: US 11,362,494 B2
(45) Date of Patent: Jun. 14, 2022

(54) ASSEMBLY, SYSTEM, AND METHODS FOR INSTALLING CONDUCTIVE ELEMENTS IN AN AIRCRAFT

(71) Applicant: The Boeing Company, Chicago, IL (US)

(72) Inventors: Colin R. Kreiger, Lake Stevens, WA (US); Alexander J. Matsuoka, Kirkland, WA (US); Derrick B. Pruitt, Bothell, WA (US); Michael E. Frick, Shoreline, WA (US); Gregory A. Tubbs, Marysville, WA (US)

(73) Assignee: The Boeing Company, Chicago, IL (US)

( * ) Notice: Subject to any disclaimer, the term of this patent is extended or adjusted under 35 U.S.C. 154(b) by 465 days.

(21) Appl. No.: 16/459,531

(22) Filed: Jul. 1, 2019

(65) Prior Publication Data

US 2021/0006051 A1 Jan. 7, 2021

(51) Int. Cl.
*H02G 3/34* (2006.01)
*H02G 3/04* (2006.01)
*H02G 1/08* (2006.01)
*B64D 11/06* (2006.01)

(52) U.S. Cl.
CPC ............. *H02G 3/0418* (2013.01); *H02G 1/08* (2013.01); *H02G 3/045* (2013.01); *H02G 3/34* (2013.01); *B64D 11/0624* (2014.12)

(58) Field of Classification Search
CPC ...... H02G 3/0406; H02G 3/04; H02G 3/0431; H02G 3/34; H02G 3/263; H02G 3/0456; H02G 3/0437; H01R 4/60; B64D 11/0624; B64D 45/00; B64D 25/20; B64D 47/00; B64D 2221/00; B64C 3/18; B60R 16/00; B60R 16/02
USPC .... 174/480, 481, 68.1, 68.3, 72 R, 72 C, 95, 174/97, 135, 482; 248/68.1, 49; 52/220.1, 220.3, 220.5, 220.7
See application file for complete search history.

(56) References Cited

U.S. PATENT DOCUMENTS

| RE32,554 E | 12/1987 | Murphy |
| 4,723,580 A * | 2/1988 | Trautwein ................ H02G 3/26 174/68.3 |
| 5,137,231 A | 8/1992 | Boss |
| 6,129,312 A | 10/2000 | Weber |
| 6,504,093 B1 * | 1/2003 | Cawley ................ H02G 3/0487 174/482 |
| 6,546,673 B2 | 4/2003 | Aquino |

(Continued)

*Primary Examiner* — Angel R Estrada

(57) ABSTRACT

There is provided a raceway cover assembly for installing conductive element(s) in an aircraft. The raceway cover assembly includes a raceway cover for removable coupling to a raceway. The raceway is configured for attachment to a sidewall assembly for use in a cabin of the aircraft. The raceway cover includes a first cover side, a second cover side, and retaining element(s) disposed on the first cover side. The raceway cover assembly further includes the conductive element(s) coupled and retained to the first cover side, with the retaining element(s), to form the raceway cover assembly. The conductive element(s) and the raceway cover are assembled together at a location off of the aircraft, prior to installing the raceway cover assembly with the one or more conductive elements in the aircraft, which allows for routing of the one or more conductive elements in the raceway cover at the location off of the aircraft.

20 Claims, 20 Drawing Sheets

(56) References Cited

U.S. PATENT DOCUMENTS

| | | | |
|---|---|---|---|
| 6,875,916 B2* | 4/2005 | Winkelbach | B64C 1/18 174/482 |
| 7,049,508 B2* | 5/2006 | Bushey | H02G 3/0425 174/481 |
| 7,077,467 B2* | 7/2006 | Wenzler | B60R 16/0215 174/481 |
| 7,385,148 B2* | 6/2008 | Picard | H02G 3/00 174/481 |
| 7,569,775 B2* | 8/2009 | Makwinski | H02G 3/0418 174/480 |
| 7,741,568 B2* | 6/2010 | Makwinski | H02G 3/0418 174/480 |
| 8,167,231 B2* | 5/2012 | Leisten | B64C 1/18 244/1 A |
| 8,183,471 B2* | 5/2012 | Handler | H02G 3/0418 174/481 |
| 8,785,779 B1* | 7/2014 | Jones | H02G 3/34 174/72 A |
| 9,040,821 B2* | 5/2015 | Blanchard | H02G 3/0431 174/72 A |
| 9,221,542 B2* | 12/2015 | Imbert | B64D 11/0696 |
| 9,499,251 B2 | 11/2016 | Perkins et al. | |
| 9,590,403 B2* | 3/2017 | Jackson, Jr. | H02G 3/0406 |
| 9,751,609 B2 | 9/2017 | Perkins et al. | |
| 9,796,245 B2 | 10/2017 | Switzer et al. | |
| 10,992,120 B2* | 4/2021 | Kreiger | H02G 3/0425 |
| 2017/0129581 A1 | 5/2017 | Perkins et al. | |
| 2017/0349261 A1 | 12/2017 | Brown et al. | |
| 2017/0349262 A1 | 12/2017 | Brown et al. | |

\* cited by examiner

| LOCATION 200 | ASSY. PLANT 202 | PROD. FACILITY 204 | WORK STATION 206 | WORK BENCH 208 |

RACEWAY COVER (RC) ASSEMBLY 10 | PLURALITY OF RC ASSEMBLIES 10a | LONG. FORE-AFT ALIGN. 56 | LENGTH 119

| RC 90 | SNAP-IN RC 92 | SNAP-IN INSTALL. 94 | BOTTOM END 96 | TAB MEM(S). 98 | TOP END 100 |
| FIRST COVER SIDE 108 | RETAINING ELEMENT(S) 95 | CLIP(S) 95a | CLAMP(S) 95b | HOOK(S) 95c |
| SECOND COVER SIDE 110 | FLANGE ELEMENTS 102 | FASTENED RC 106 | FASTENER ELEM(S). 104 |
| ACCESS OPEN(S). 114 | UNIT. STRUC. 118 | RC SECT(S). 120 | ADJ. RC SECT(S). 120a | END POR. 122 |

CONDUCTIVE ELEMENT(S) 50 | CONT. COND. ELEM(S). 50a | SHORT LENGTH COND. ELEM(S). 50b

| CONNECTOR PORTIONS 51 | WIRES 60 | PCBS 64 | TUBES 66 | CAPACITORS 68 |
| CABLES 62 | ELECTRICAL CABLES 62a | DATA BUS CABLES 62b |
| HIGH SPEED TRANSMISSION CABLES 62c | COAXIAL CABLES 62d | FIBER OPTIC CABLES 62e |
| ELECTRICAL RUN(S) 70 | POWER RUNS 72 | DATA RUNS 74 | LIGHTING SYS. RUNS 76 |
| SEAT SYS. RUNS 78 | IFE SYS. RUNS 80 | SEAT ACTUATION RUNS 82 | PED RUNS 84 |
| SYS. TRANS. ELEM(S). 85 | PNEUM. LINES 85a | AIR LINES 85b | FLUID LINES 85c | WATER LINES 85d |
| ROUTING PATH 86 | DIFF. AC CABIN LAYOUTS 87 | SYSTEMS ROUTING 88 | BEND RADIUS 194 |

RACEWAY 18

| INT. SIDE 19a | EXT. SIDE 19b | FIRST END 20 | SECOND END 21 | RACEWAY TRACK PORTION 23 |
| OPENINGS 25 | ATTACHMENT ELEMENT(S) 30 | BRACKET(S) 30a | CLIP(S) 30b | BOLT(S) 30c |
| RACEWAY BODY (RB) 24 | ELONGATED RB 24a | FIRST SIDE 34 | SECOND SIDE 36 |
| ACCESS OPENINGS 40 | LENGTH 44 | RB SECTIONS 54 | ADJ. RB SECTIONS 54a |
| LONG. FORE-AFT ALIGN. 56 | END POR(S). 58 | FLANGE POR(S). 42 | UNDERSIDE 43 | FIN POR(S). 45 |

| CLOSEOUT AREA 142 | CROSS-SECTIONAL AREA 144 | UNUSED VOLUME 148 |

BREAKOUT COVER (BC) 124

| BC OPENING(S) 126 | SNAP-IN BC 128 | BC SNAP-IN INSTALLATION 130 | BOTTOM END 132 |
| TAB MEMBERS 134 | TOP END 136 | FASTENED BC 138 | INTERMIT. ROUTING BREAKOUTS 139 |

SIDEWALL CLOSEOUT AREA ASSEMBLY 12

| INTEGRATED STRUCTURE 31 | MODULAR DESIGN 146 | VARIABILITY ELIMINATION 154 |
| FLOOR PEN. ELIM. 150 | FUNCT. ELECTRICAL CONDUIT 156 | NONCONDUCTIVE MATERIAL(S) 140 |

FIG. 1A

| LOCATION 200 | ASSY. PLANT 202 | PROD. FACILITY 204 | WORK STATION 206 | WORK BENCH 208 |

SIDEWALL CLOSEOUT AREA CARTRIDGE SYSTEM 11

PLURALITY OF SIDEWALL CLOSEOUT AREA CARTRIDGE SYSTEMS 11a

RACEWAY COVER ASSEMBLY 10
- RACEWAY COVER 90
- FIRST COVER SIDE 108
- RETAINING ELEMENT(S) 95
- CONDUCTIVE ELEMENT(S) 50
- SECOND COVER SIDE 110
- RACEWAY 18
- ATTACHED INSTALLATION 198

AIR GRILLE PANEL 166
- BOTTOM END 168a
- TOP END 168b
- INTERIOR SIDE 170a
- EXTERIOR SIDE 170b
- AIR GRILLE OPENING 172
- AIR GRILLE 174
- GAP(S) 175

AIR GRILLE PANEL CARTRIDGE ASSEMBLY 13
PLURALITY OF AIR GRILLE PANEL CARTRIDGE ASSEMBLIES 13a

SIDEWALL PANEL(S) 160
- BOTTOM END 162a
- TOP END 162b
- INTERIOR SIDE 164a
- EXTERIOR SIDE 164b

SIDEWALL ASSEMBLY 26 | BOTTOM PORTION 28 | TOP PORTION 29

VEHICLE 14
- AIRCRAFT (AC) 16
- INTERIOR FRAME 38
- CROWN AREA 46
- UNDERFLOOR AREA 52
- CABIN 48
- PASSENGER CABIN 48a
- INTERIOR 112
- LENGTH 158
- FLOOR 152
- OVERFLOOR AREA 116
- CEILING 153
- AC FLOOR STRUCTURE(S) 32
- FORE-AFT LONGITUDINAL FLOOR GRID STRUCTURE 176
- LONGITUDINAL SEAT TRACK 178
- FLOOR PANEL 180
- SEAT(S) 182
- PALLETIZED SEAT(S) 182a
- SEAT LEG(S) 184
- SEAT TRACK COVER 186
- SEAT SHROUD 188
- MOPSILL 190
- SEAL 192
- BOAT 15
- TRAIN 17

FIG. 1B

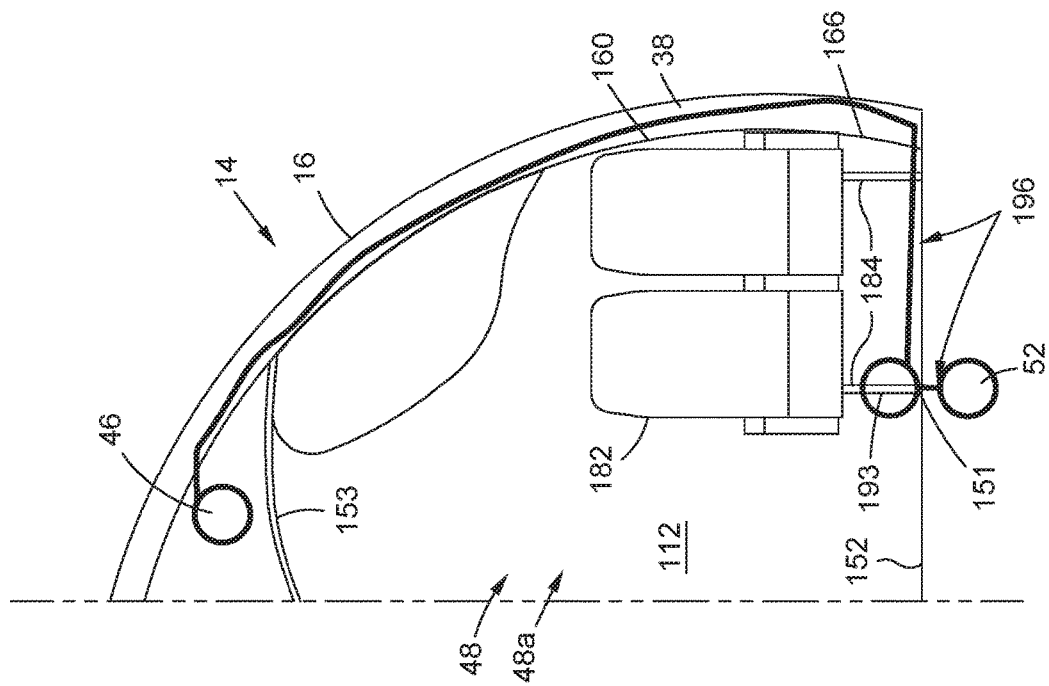
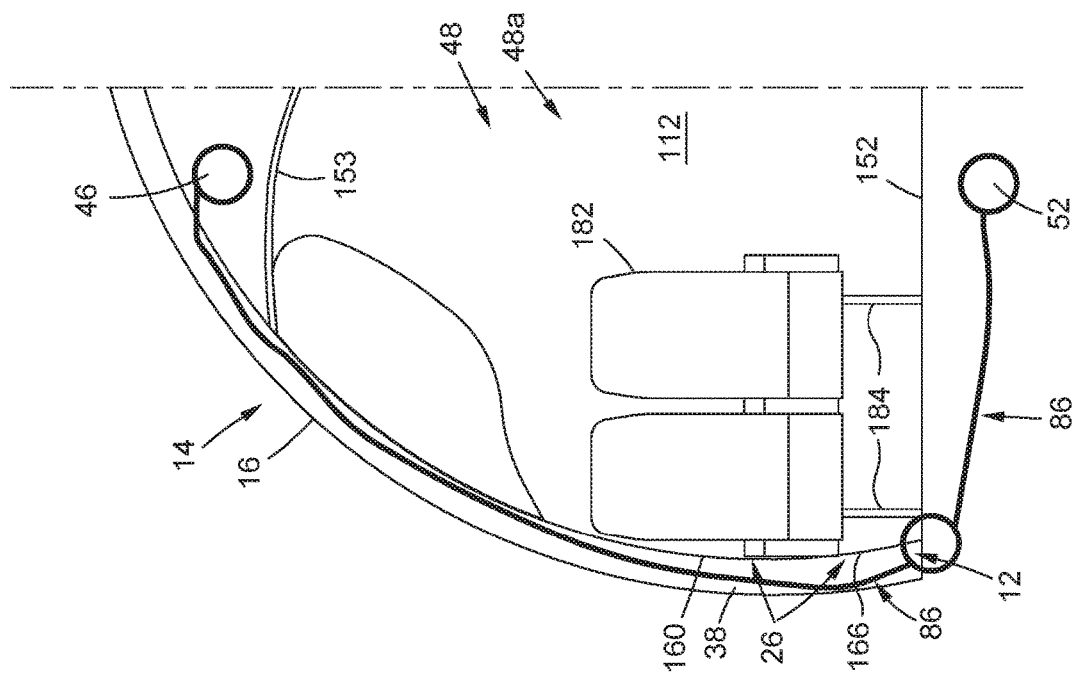

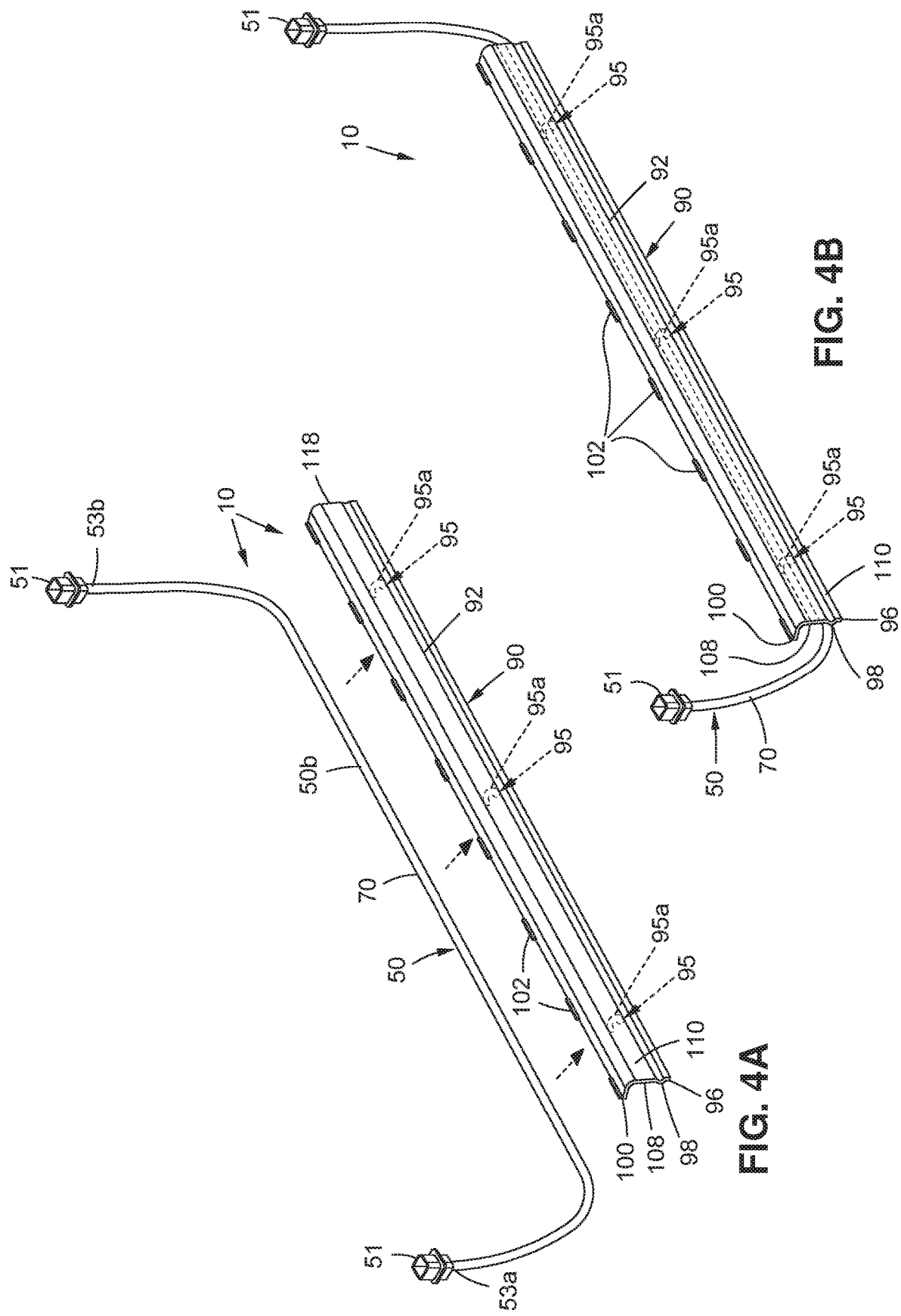

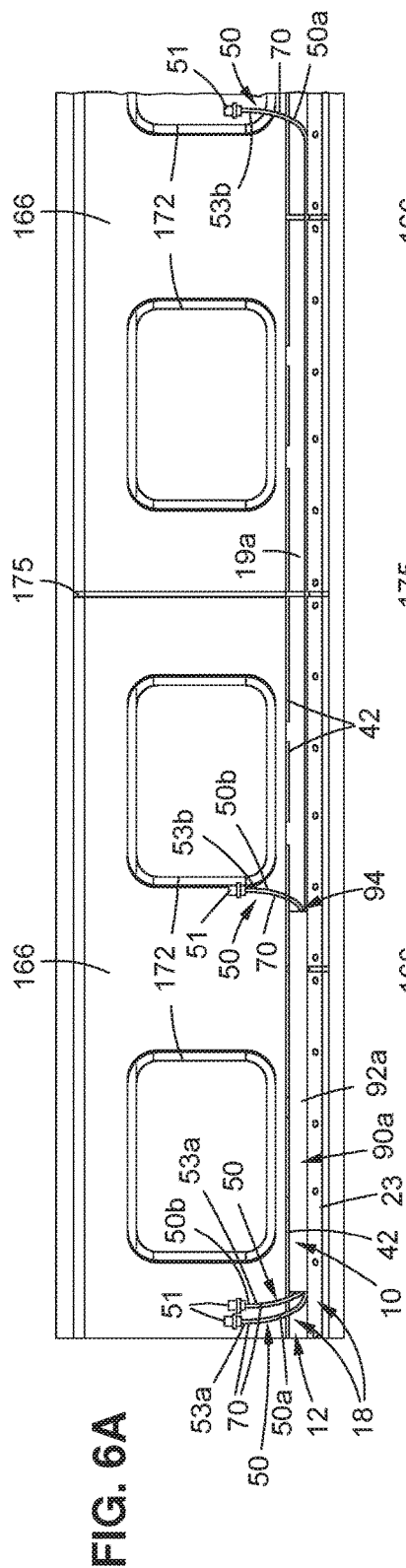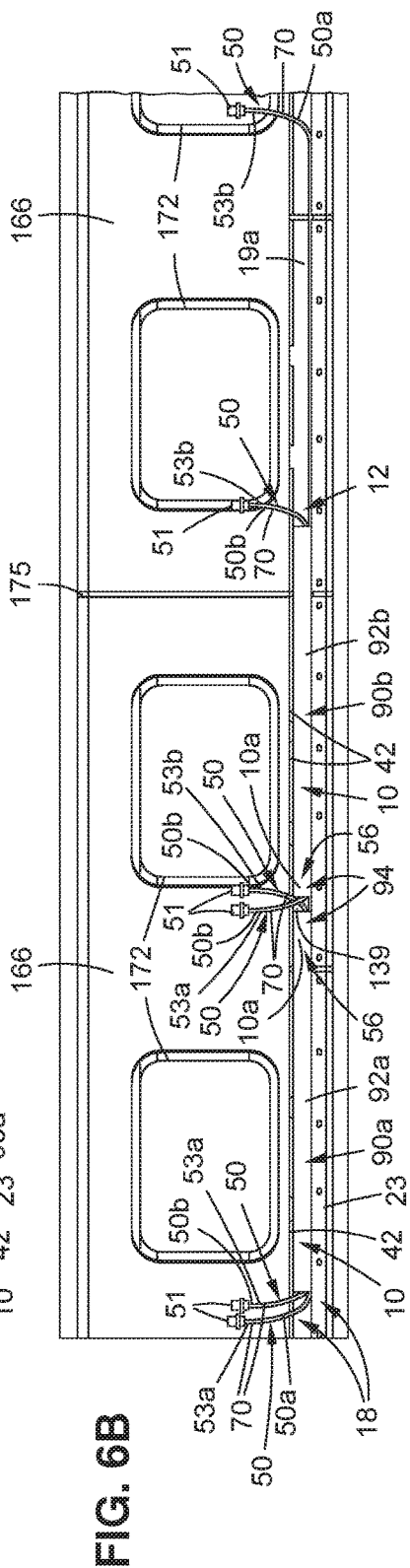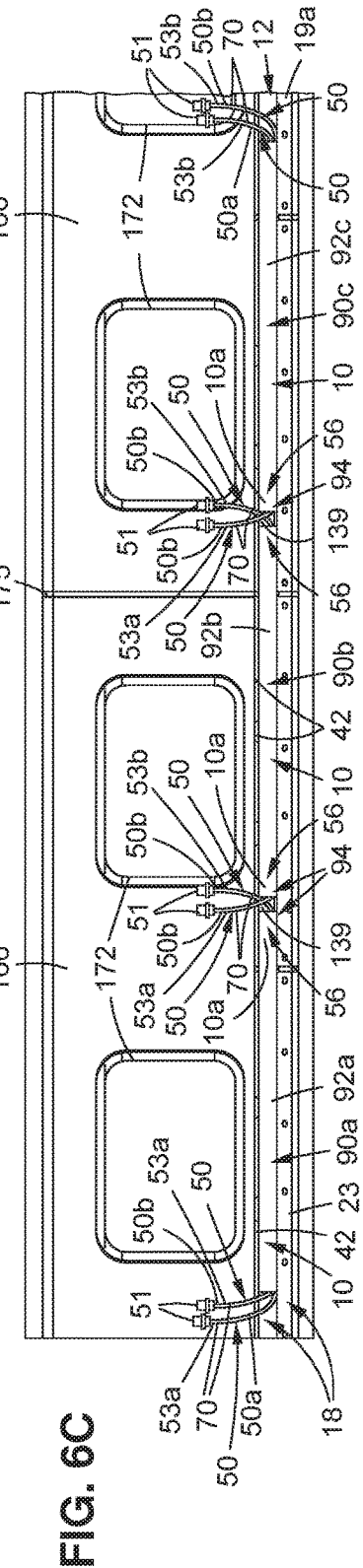

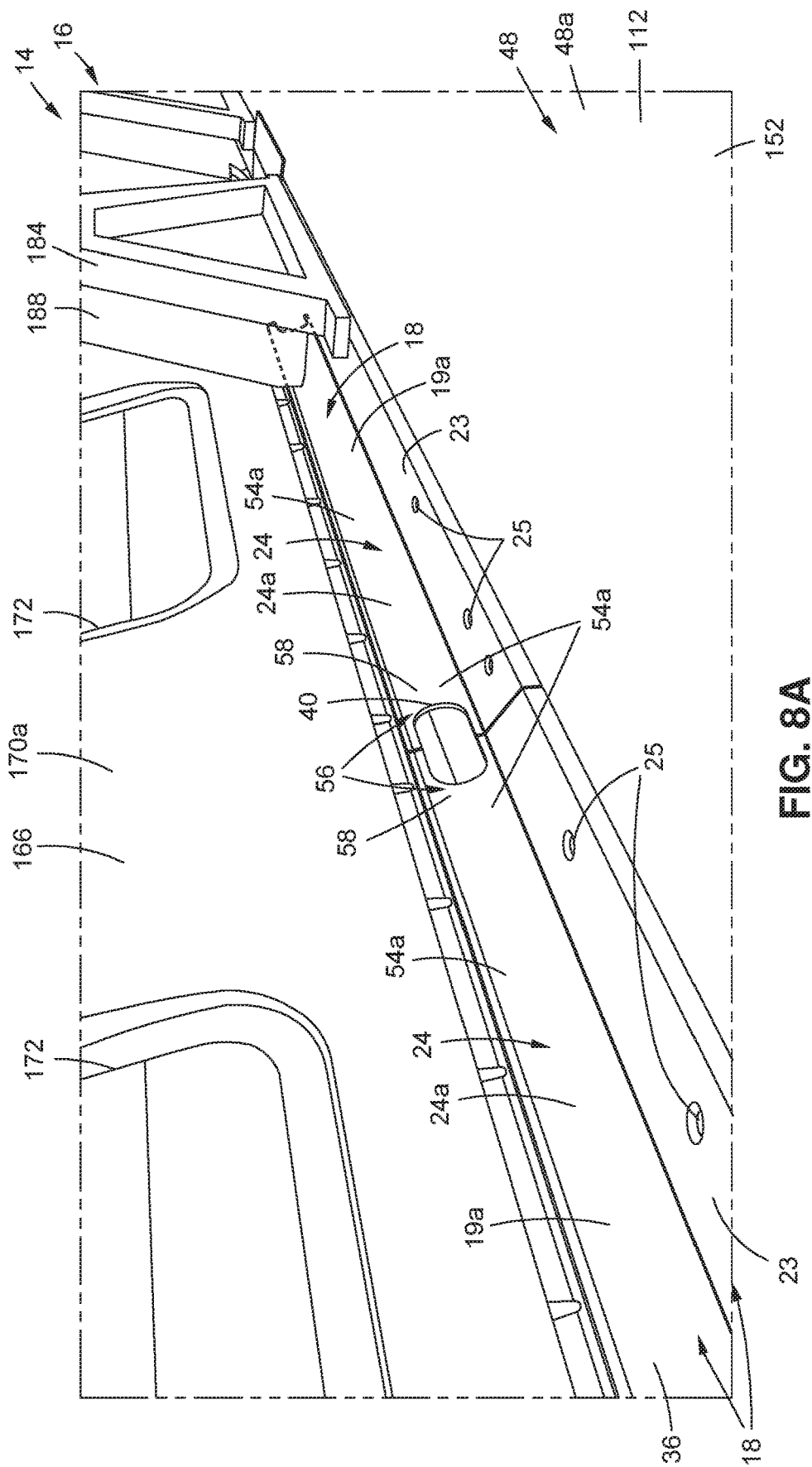

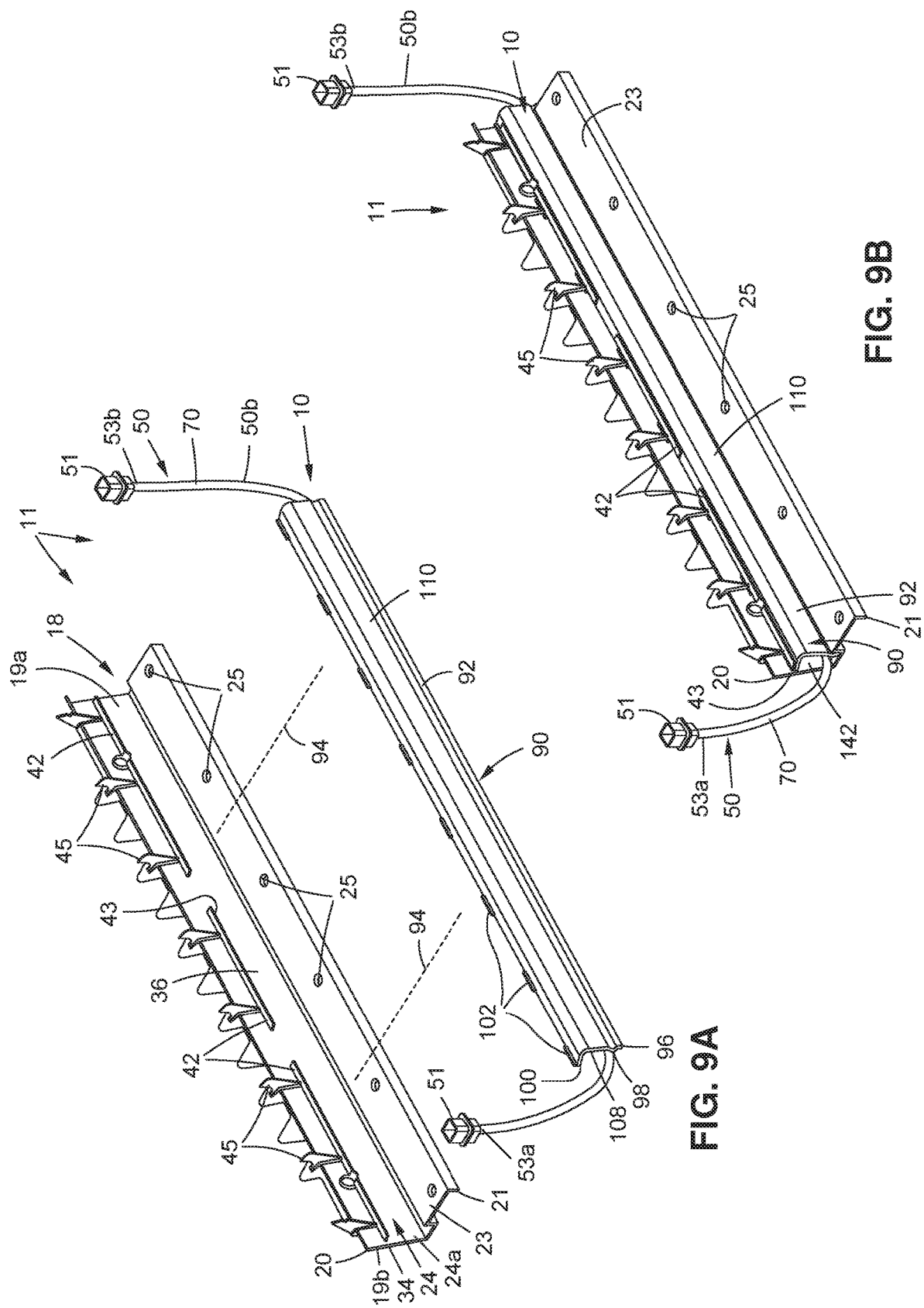

ASSEMBLY, SYSTEM, AND METHODS FOR INSTALLING CONDUCTIVE ELEMENTS IN AN AIRCRAFT

CROSS REFERENCE TO RELATED APPLICATION

This nonprovisional patent application is related to contemporaneously filed U.S. nonprovisional patent application Ser. No. 16/459,499, titled SIDEWALL CLOSEOUT AREA ASSEMBLY, SYSTEM, AND METHOD FOR ROUTING CONDUCTIVE ELEMENTS IN AN AIRCRAFT, filed on Jul. 1, 2019, the contents of which are hereby incorporated by reference in its entirety.

FIELD

The disclosure relates generally to sidewall panel assemblies, systems, and methods for aircraft, and more particularly, to sidewall panel assemblies, systems, and methods for installing conductive elements in aircraft passenger cabins.

BACKGROUND

Aircraft, such as commercial aircraft, have sidewall panels located in an interior of an aircraft passenger cabin. Such sidewall panels are designed to cover an aircraft frame and walls, as well as to cover aircraft insulation, ducting, and conductive elements, such as electrical runs, for example, wiring and cables, and systems transport elements, for example, air lines and water lines, which are located along the length of the aircraft passenger cabin.

Conductive elements, such as electrical runs including power, data, in-flight entertainment (IFE), lighting, and other seat systems, are typically routed from behind sidewall panels or from under the floor to the seats in the aircraft passenger cabin. The conductive elements, such as electrical runs, may be installed in conduits that are attached by adhesive, or other attachment means, to the aircraft floor. These conduits are typically covered with floor coverings, such as carpet or mats, which may cause bumps and discontinuities in the floor coverings. Moreover, such floor coverings may require additional seams for breakout locations for the electrical runs. Further, secondary shielding layers may need to be installed around the electrical runs to avoid damage from potential contact sources, such as passengers or carry-on freight. However, such secondary shielding layers may be heavy and add unwanted weight to the aircraft. Also, with reconfigurable palletized seats, which have large metallic structures that are bolted to the floor of the aircraft passenger cabin, when such palletized seats are reconfigured, complex conduit or raceway layouts must be designed to avoid the large metallic structures.

Known methods of routing conductive elements in an aircraft passenger cabin exist. Such known methods may involve installing all of the conduits into the aircraft passenger cabin and then routing the conductive elements, such as electrical runs or systems transport elements, through the conduits. This may require that installers or mechanics work in positions, e.g., on their knees, for extended periods of time, while routing the conductive elements in the conduits. Further, such known methods of routing conductive elements in an aircraft passenger cabin may be time intensive, as installers and mechanics may need to leave the aircraft to retrieve each independent part or tool to install the conduits and route the conductive elements.

Moreover, aircraft components that connect to such conductive elements may not be able to be transported into the aircraft passenger cabin until the routing is completed. When such aircraft components are brought into the aircraft passenger cabin, they need to avoid the conduits which may present an obstacle, and any possible exposed ends of the conductive elements need to be protected to avoid any possible damage that may be caused by the aircraft components, by tools, or by installers or mechanics. Thus, since the conductive elements are not pre-routed in the conduit, secondary protective measures may be needed to avoid damage to the conductive elements. Further, known methods of routing conductive elements in an aircraft passenger cabin may result in numerous variable configurations and layouts that may be difficult to manage and difficult to install.

In addition, known methods of routing conductive elements in an aircraft passenger cabin do not integrate the conductive elements into an assembly that may be installed in a single step in the aircraft passenger cabin, and do not allow for the conductive elements to be installed in a conduit or raceway cover off of the aircraft at a location, such as an assembly plant or work station, that is optimized for ergonomics and part or tool availability. Moreover, such known methods of routing conductive elements in an aircraft passenger cabin may require that the conduits for a raceway be trimmed and cut to fit the conductive elements. Such trimming and cutting is typically performed with hand tools and may create Foreign Object Debris (FOD), which may cause issues with aircraft decorative surfaces. Thus, such aircraft decorative surfaces may need to be protected to avoid any possible damage. This may result in increased time and expense to protect the aircraft decorative surfaces.

Accordingly, there is a need in the art for an assembly, system, and methods for assembling and routing conductive elements off of an aircraft, prior to installation in an aircraft passenger cabin, that integrate conductive elements into an assembly or system that may be installed in a single step, that reduce the time to install the conductive elements, that increase cost savings for production, that eliminate variability in design and installation, that reduce ergonomic issues, that allow for rapid reconfiguration of seats in the aircraft passenger cabin, and that provide further advantages over known assemblies, systems, and methods.

SUMMARY

Example implementations of the present disclosure provide for an assembly, system, and methods for installing conductive elements in an aircraft. As discussed in the below detailed description, versions of the assembly, system, and methods for installing conductive elements in an aircraft may provide significant advantages over known assemblies, systems, and methods.

In a version of the disclosure, there is provided a raceway cover assembly for installing one or more conductive elements in an aircraft. The raceway cover assembly comprises a raceway cover configured for removable coupling to a raceway. The raceway is configured for attachment to a sidewall assembly for use in an interior of a cabin of the aircraft. The raceway cover comprises a first cover side configured to face an interior side of the raceway, a second cover side configured to face the interior of the cabin, and one or more retaining elements disposed on the first cover side. The raceway cover assembly further comprises the one or more conductive elements coupled and retained to the first cover side, with the one or more retaining elements, to form the raceway cover assembly.

The one or more conductive elements and the raceway cover are assembled together at a location off of the aircraft, prior to installing the raceway cover assembly in the aircraft, which allows for routing of the one or more conductive elements in the raceway cover at the location off of the aircraft.

In another version of the disclosure, there is provided a sidewall closeout area cartridge system for installing one or more conductive elements in an aircraft. The sidewall closeout area cartridge system comprises a raceway configured for attachment to a sidewall assembly for use in an interior of a cabin of the aircraft.

The sidewall closeout area cartridge system further comprises a raceway cover assembly. The raceway cover assembly comprises a raceway cover removably coupled to the raceway. The raceway cover has a first cover side facing an interior side of the raceway, a second cover side configured to face the interior of the cabin, and one or more retaining elements disposed on the first cover side. The raceway cover assembly further comprises the one or more conductive elements coupled and retained to the first cover side, with the one or more retaining elements.

The raceway cover assembly and the raceway are assembled together at a location off of the aircraft, to form the sidewall closeout area cartridge system, prior to installing the sidewall closeout area cartridge system in the aircraft, which allows for routing of the one or more conductive elements in the sidewall closeout area cartridge system at the location off of the aircraft.

In another version of the disclosure, there is provided a method for installing one or more conductive elements in an aircraft. The method comprises the step of assembling a raceway cover assembly, by coupling and retaining the one or more conductive elements to a first cover side of a raceway cover, with one or more retaining elements disposed on the first cover side.

The method further comprises the step of installing the one or more conductive elements in the aircraft, by removably coupling the raceway cover assembly, via a snap-in installation, to a raceway. The raceway is attached to a bottom end of an air grille panel of a sidewall assembly in an interior of a cabin of the aircraft. The raceway cover assembly is assembled at a location off of the aircraft, prior to the snap-in installation of the raceway cover assembly to the raceway, which allows for routing of the one or more conductive elements in the raceway cover at the location off of the aircraft.

In another version of the disclosure, there is provided a method for installing one or more conductive elements in an aircraft. The method comprises the step of assembling a sidewall closeout area cartridge system, by removably coupling a raceway cover assembly, via a snap-in installation, to a raceway. The raceway cover assembly comprises a raceway cover having a first cover side facing an interior side of the raceway, a second cover side configured to face an interior of a cabin of the aircraft, and one or more retaining elements disposed on the first cover side. The raceway cover assembly further comprises the one or more conductive elements coupled and retained to the first cover side, with the one or more retaining elements.

The method further comprises the step of installing the one or more conductive elements in the aircraft, by attaching the sidewall closeout area cartridge system, via an attached installation, to a sidewall assembly in the interior of the cabin of the aircraft. The sidewall closeout area cartridge system is assembled at a location off of the aircraft, prior to the attached installation of the sidewall closeout area cartridge system to the sidewall assembly, which allows for routing of the one or more conductive elements in the sidewall closeout area cartridge system at the location off of the aircraft.

The features, functions, and advantages that have been discussed can be achieved independently in various versions of the disclosure or may be combined in yet other versions further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein:

FIG. 1A is an illustration of a functional block diagram showing an exemplary version of a raceway cover assembly of the disclosure coupled to a raceway;

FIG. 1B is an illustration of a functional block diagram showing an exemplary version of a sidewall closeout area cartridge system of the disclosure coupled to an air grille panel of a sidewall assembly for use in a vehicle;

FIG. 2A is an illustration of a back cross-sectional view of a cabin of an aircraft showing a routing path accessing a crown area and accessing an underfloor area, via a sidewall closeout area assembly;

FIG. 2B is an illustration of a back cross-sectional view of a cabin of an aircraft showing a known routing path accessing an underfloor area, via a hole in a floor at an inboard seat leg area, and accessing a crown area;

FIG. 4A is an illustration of a perspective exploded side view of a version of a raceway cover assembly of the disclosure, showing a second cover side of a raceway cover and a conductive element;

FIG. 4B is an illustration of a perspective assembled side view of the raceway cover assembly of FIG. 4A;

FIG. 6A is an illustration of a side view of a version of a raceway cover assembly removably coupled to the raceway of FIG. 5;

FIG. 6B is an illustration of a side view of a version of two raceway cover assemblies removably coupled to the raceway of FIG. 5;

FIG. 6C is an illustration of a side view of a version of three raceway cover assemblies removably coupled to the raceway of FIG. 5;

FIG. 8A is an illustration of an inboard side perspective close-up view of a version of raceways attached between an air grille panel and a floor in an interior of a cabin;

FIG. 9A is an illustration of a perspective exploded side view of a version of a sidewall closeout area cartridge system of the disclosure, showing a raceway cover assembly and a raceway;

FIG. 9B is an illustration of a perspective assembled side view of the sidewall closeout area cartridge system of FIG. 9A;

Figure 3A:
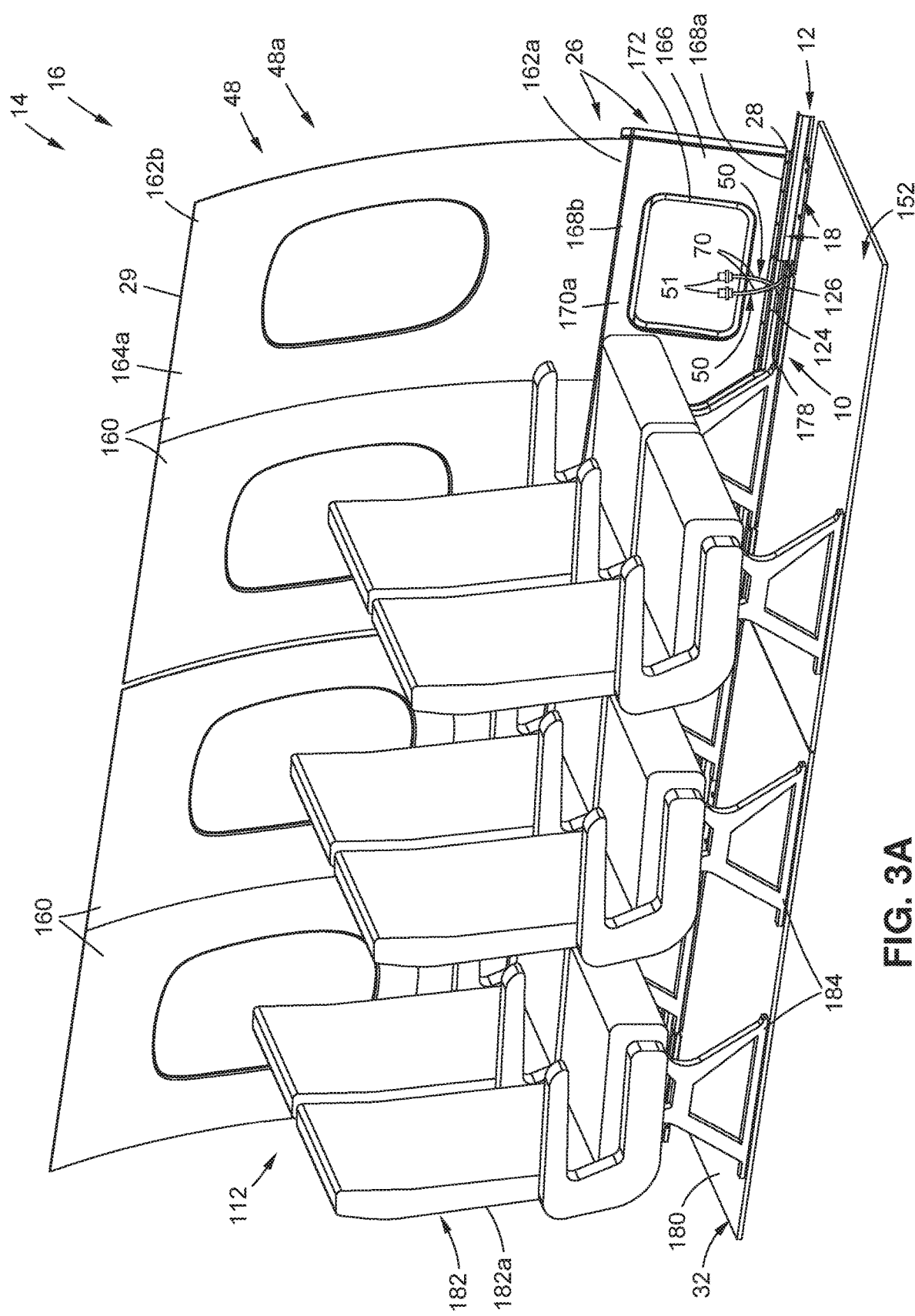
FIG. 3A is an illustration of a front perspective view of a cabin of an aircraft showing a version of a raceway cover assembly of the disclosure removably coupled to a raceway.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Now referring to the Figures, FIG. 1A is an illustration of a functional block diagram showing an exemplary version of a raceway cover assembly 10 of the disclosure, coupled to, and configured to couple to, a raceway 18, and FIG. 1B is an illustration of a functional block diagram showing an exemplary version of a sidewall closeout area cartridge system 11 of the disclosure, coupled to, and configured to couple to, an air grille panel 166 of a sidewall assembly 26 for use in a vehicle 14, such as an aircraft 16, a boat 15, a train 17, or another suitable vehicle designed to carry passengers.

In a version of the disclosure, there is provided a raceway cover assembly 10 (see FIG. 1A) for installing one or more conductive elements 50 (see FIG. 1A) in the vehicle 14 (see FIG. 1B), such as the aircraft 16 (see FIG. 1B), or other suitable vehicle. As shown in FIG. 1A, the raceway cover assembly 10 comprises a raceway cover (RC) 90 configured for removable coupling or attachment, and is removably coupled or attached, to the raceway 18. The raceway 18 is configured for attachment, and is attached, to the sidewall assembly 26 (see FIG. 1B) for use in an interior 112 (see FIG. 1B) of a cabin 48 (see FIG. 1B), such as a passenger cabin 48a (see FIG. 1B), of the vehicle 14, such as the aircraft 16.

As shown in FIG. 1A, in one version, the raceway cover 90 comprises a snap-in raceway cover (RC) 92. The raceway cover 90, such as in the form of the snap-in raceway cover 92, is configured for a snap-in installation 94 (see FIG. 1A), to the raceway 18. The raceway cover 90, such as in the form of the snap-in raceway cover 92, comprises a bottom end 96 (see FIGS. 1A, 4A), tab members 98 (see FIGS. 1A, 4A) formed near the bottom end 96, that are configured to couple to a raceway track portion 23 (see FIGS. 1A, 9B) of the raceway 18 (see FIGS. 1A, 9B), and a top end 100 (see FIGS. 1A, 4A) that is configured to slide under and abut against an underside 43 (see FIG. 1A) of one or more flange portions 42 (see FIGS. 1A, 7) of the raceway 18.

The raceway cover 90, such as in the form of the snap-in raceway cover 92, is easily coupled to the aircraft floor structure 32 and to the raceway 18, and is easily removable from the aircraft floor structure 32 and from the raceway 18. The raceway cover 90, such as in the form of the snap-in raceway cover 92, does not require any additional fastener elements 104 (see FIG. 1A) to couple, or attach, the raceway cover 90 to the raceway 18.

In another version, the raceway cover 90 may comprise a fastened raceway cover (RC) 106 (see FIG. 1A) that may be fastened to the raceway 18 and/or to the aircraft floor structure 32 with one or more fastener elements 104 (see FIG. 1A), such as bolts, screws, clips, or other suitable fastener elements.

As shown in FIG. 1A, the raceway cover 90 further comprises a first cover side 108 (see also FIG. 4A) configured to face, and facing, an interior side 19a (see also FIG. 7) of the raceway 18. As shown in FIG. 1A, the raceway cover 90 further comprises a second cover side 110 configured to face, and facing, the interior 112 (see FIGS. 1B, 8B) of the cabin 48, when the raceway cover 90 is coupled, or attached, to the raceway 18.

As shown in FIG. 1A, the raceway cover 90 further comprises one or more retaining elements 95 (see also FIG. 4C) disposed on the first cover side 108. The one or more retaining elements 95 disposed on the first cover side 108 of the raceway cover 90 comprise one or more of, clips 95a (see FIG. 1A), clamps 95b (see FIG. 1A), hooks 95c (see FIG. 1A), or other suitable retaining elements, to retain one or more conductive elements 50 along the first cover side 108 of the raceway cover 90. The raceway cover 90 may further comprise one or more flange elements 102 (see FIGS. 1A, 4A) positioned and spaced along the top end 100 of the raceway cover 90.

The raceway cover 90 of the raceway cover assembly 10 preferably comprises a unitary structure 118 (see FIG. 1A). The raceway cover 90 of the raceway cover assembly 10 preferably has a length 119 (see FIG. 1A) based on how far apart the seats 182 (see FIG. 1B) are configured in the cabin 48 (see FIG. 1B), depending on whether the seats 182 are in economy class, business class, or first class. For example, the raceway cover 90 may have a length 119 in a range of from 28 inches to 36 inches (e.g., in economy class), may have a length 119 in a range of from 36 inches to 42 inches (e.g., business class), may have a length 119 in a range of from 42 inches to 64 inches (e.g., first class), or may have another suitable length.

The raceway cover 90 may include one or more access openings 114 (see FIG. 1A) formed through the raceway cover 90. The one or more access openings 114 (see FIG. 1A) may provide access to the interior cabin 48 of the vehicle 14, such as the aircraft 16, and may provide access to an overfloor area 116 (see FIG. 1B) in the cabin 48, for the one or more conductive elements 50 retained in the raceway cover 90.

Figure 8B:
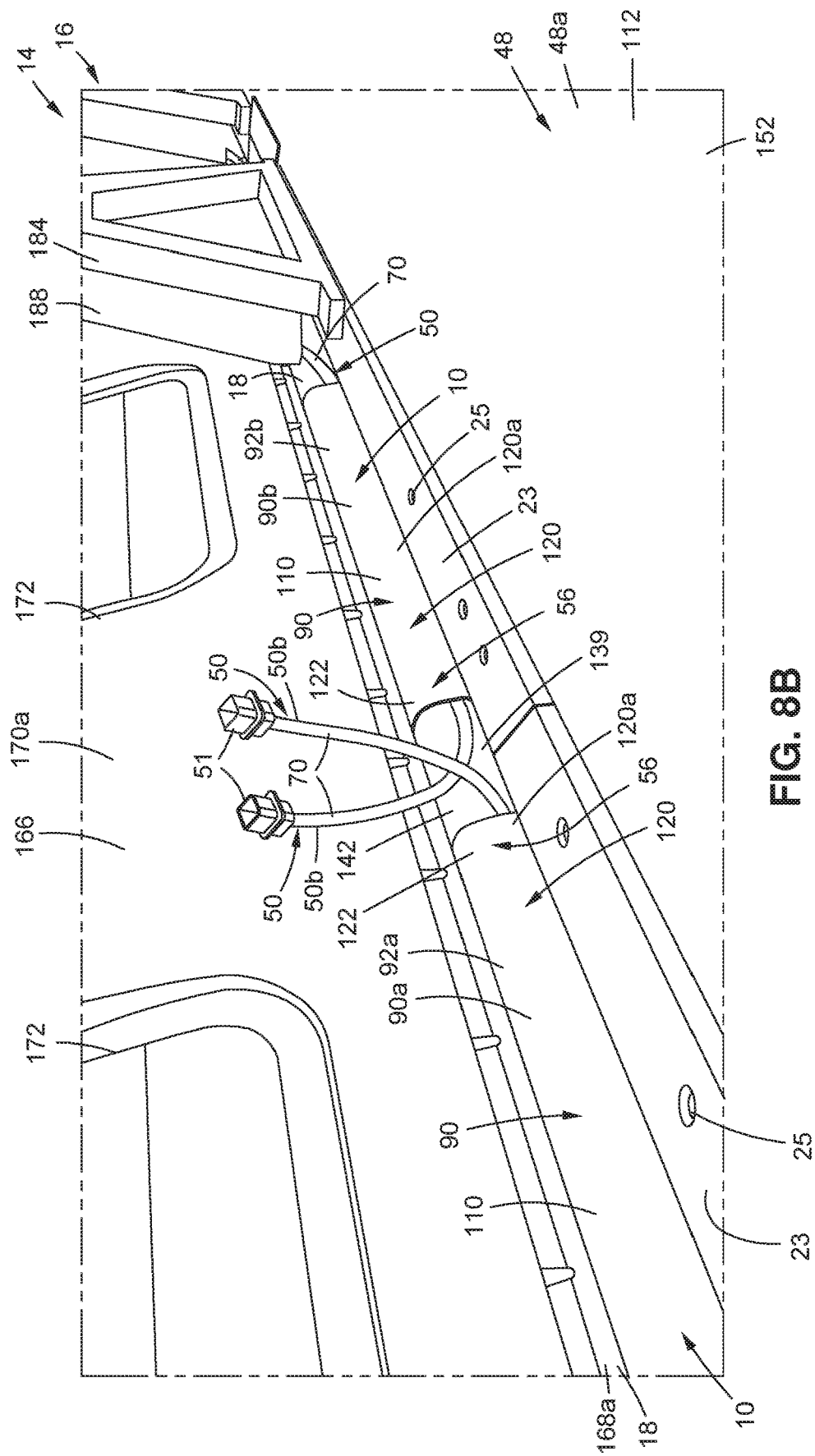
FIG. 8B is an illustration of an inboard side perspective close-up view of a version of two raceway cover assemblies attached to the raceways of FIG. 8A.

When two or more raceway cover assemblies 10 (see FIGS. 1A, 6C, 8B), such as a plurality of raceway cover assemblies 10a (see FIG. 1A), are each removably coupled to the raceway 18 (see FIGS. 1A, 6C, 8B), the two or more raceway cover assemblies 10 are preferably positioned in a longitudinal fore-aft alignment 56 (see FIGS. 1A, 6C, 8B). In one version, the raceway covers 90 may be in the form of a plurality of raceway cover (RC) sections 120 (see FIGS. 1A, 8B), such as in the form of adjacent raceway cover (RC) sections 120a (see FIGS. 1A, 8B), aligned adjacent to each other, or configured to be aligned adjacent to each other, along the raceway 18. Intermittent routing breakouts 139 (see FIGS. 1A, 6C, 8B) may be formed between end portions 122 (see FIGS. 1A, 8B) of the raceway cover sections 120 that are aligned.

As shown in FIG. 1A, the raceway cover assembly 10 further comprises one or more conductive elements 50 coupled and retained to the first cover side 108, with the one or more retaining elements 95, to form the raceway cover assembly 10. The one or more conductive elements 50 comprise one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, and other suitable conductive elements.

As shown in FIG. 1A, the one or more conductive elements 50 further comprise one or more electrical runs 70 comprising one or more of, power runs 72, data runs 74, lighting system runs 76, and seat system runs 78, including in-flight entertainment (IFE) system runs 80, seat actuation runs 82, and personal electronic device (PED) runs 84, and other suitable electrical runs.

As shown in FIG. 1A, the one or more conductive elements 50 further comprise one or more systems transport elements 85 comprising one or more of, pneumatic lines 85a, air lines 85b, fluid lines 85c, water lines 85d, or other suitable systems transport elements. For example, the pneumatic lines 85a or air lines 85b may be used for lumbar support in seats 182 (see FIG. 1B) in the cabin 48 (see FIG. 1B), or for passenger air vents, and the fluid lines 85c or water lines 85d may be used for a potable water supply, or vending drink service to seats 182, such as in first class.

The one or more conductive elements 50 are preferably short in length and comprise one or more short length conductive elements 50b (see FIG. 1A), when attached or coupled to the first cover side 108 of the raceway cover 90. The one or more conductive elements 50, such as in the form of continuous conductive elements 50a (see FIG. 1A), are preferably long in length and continuous, when attached or coupled along the raceway 18. Each end of the conductive element 50 (see FIGS. 1A, 4A) and each end of the continuous conductive element 50a (see FIG. 1A, 5) preferably has a connector portion 51 (see FIGS. 1A, 4A, 5) configured to connect to, and connecting to, a connector element, for example, an electrical disconnect bracket (not shown), an integrated connector (not shown), or other suitable connector elements, in the seats 182 (see FIG. 1B), in a crown area 46 (see FIG. 1B) above the cabin 48 (see FIG. 1B), in an underfloor area 52 (see FIG. 1B) below the cabin 48, in an overfloor area 116 (see FIG. 1B), or in another area of the cabin 48. Each continuous conductive element 50a preferably has a greater or longer length than each short length conductive element 50b.

The raceway cover assembly 10, which includes the one or more conductive elements 50 and the raceway cover 90, are preferably assembled together at a location 200 (see FIG. 1A) off of the vehicle 14, such as the aircraft 16, prior to installing the raceway cover assembly 10 in the vehicle 14, such as the aircraft 16. This allows for routing of the one or more conductive elements 50 in the raceway cover 90 at the location 200 off of the aircraft 16. Thus, the raceway cover assembly 10 does not require routing of the one or more conductive elements 50, such as the short length conductive elements 50b, on the vehicle 14, such as the aircraft 16. As shown in FIGS. 1A-1B, the location 200 may comprise an assembly plant 202, a production facility 204, a work station 206, a work bench 208, or another suitable location off of the vehicle 14, such as the aircraft 16.

As further shown in FIG. 1A, the raceway cover assembly 10, or a plurality of raceway cover assemblies 10a, are removably coupled or attached to the raceway 18. The raceway 18 comprises an interior side 19a (see FIGS. 1A, 5, 9A), an exterior side 19b (see FIGS. 1A, 9A), a first end 20 (see FIGS. 1A, 9A), a second end 21 (see FIGS. 1A, 9A), and a raceway body (RB) 24 (see FIGS. 1A, 9A), such as an elongated raceway body (RB) 24a (see FIGS. 1A, 9A), formed between the first end 20 and the second end 21. The raceway 18 further comprises a raceway track portion 23 (see FIGS. 1A, 5, 9A) with openings 25 (see FIGS. 1A, 5, 9A) formed through the raceway track portion 23.

The first end 20 of the raceway 18 is configured to attach, and attaches, to the sidewall assembly 26 (see FIG. 1B), for example, to a bottom portion 28 (see FIGS. 1B, 3A) of the sidewall assembly 26. In particular, the raceway 18 is attached to a bottom end 168a (see FIGS. 1B, 3A, 5) of an air grille panel 166 (see FIGS. 1B, 3A, 5) of the sidewall assembly 26 (see FIGS. 1B, 3A). The raceway cover assembly 10 (see FIGS. 1A, 3A) is installed in the cabin 48 (see FIGS. 1B, 3A), via a snap-in installation 94 (see FIG. 1A), to the raceway 18 (see FIGS. 1A, 3A, 5). The one or more continuous conductive elements 50a (see FIGS. 1A, 5) are preferably routed along and installed in the raceway 18, prior to the raceway cover assembly 10 being installed, via the snap-in installation 94, to the raceway 18.

In one version, the first end 20 of the raceway 18 may be attached to the sidewall assembly 26 with a plurality of attachment elements 30 (see FIGS. 1A, 9C), for example, brackets 30a (see FIGS. 1A, 9C), clips 30b (see FIG. 1A), bolts 30c (see FIG. 1A), or other suitable attachment elements. Alternatively, the first end 20 of the raceway 18 may be attached or bonded to the sidewall assembly 26 with adhesive, or with another suitable means of attachment.

In another version, the first end 20 of the raceway 18 may be integrated with, or formed with, the sidewall assembly 26, such as the bottom portion 28 of the sidewall assembly 26, so that the sidewall closeout area assembly 12 is an integrated structure 31 (see FIG. 1A). The sidewall assembly 26 is discussed in further detail below.

The second end 21 of the raceway 18 is configured to attach, and attaches, to one or more aircraft floor structures 32 (see FIG. 1B), discussed in further detail below. The second end 21 of the raceway 18 may be attached to the one or more aircraft floor structures 32 with a plurality of attachment elements 30 (see FIG. 1A), for example, brackets 30a (see FIG. 1A), clips 30b (see FIG. 1A), bolts 30c (see FIG. 1A), or other suitable attachment elements, or may be attached or bonded with adhesive, or may be attached with another suitable means of attachment.

As shown in FIG. 1A, the raceway body 24 has a first side 34 and a second side 36. The first side 34 is configured to face, and faces, an interior frame 38 (see FIGS. 1B, 3B) of the vehicle 14 (see FIG. 3B), such as the aircraft 16 (see FIG. 3B), when the raceway 18 is installed in the vehicle 14, such as the aircraft 16. When the raceway cover 90 of the raceway cover assembly 10 is coupled, or attached, to the raceway 18, the second side 36 of the raceway body 24 faces the first cover side 108 of the raceway cover 90.

The raceway body 24 may comprise one or more access openings 40 (see FIGS. 1A, 8A) formed through the raceway body 24. The raceway body 24 may comprise flange portions 42 (see FIG. 1A, 5, 9A) extending inboard, or inwardly from the second side 36 (see FIGS. 1A, 9A), of the raceway body 24 and extending along a length 44 (see FIG. 1A) of the raceway 18. The raceway body 24 of the raceway 18 further comprises fin portions 45 (see FIGS. 1A, 9A) near the first end 20.

The one or more access openings 40 may optionally provide access to the crown area 46 (see FIG. 1B) located above the cabin 48 (see FIG. 1B), such as the passenger cabin 48a (see FIG. 1B), in the aircraft 16, for the one or more conductive elements 50, such as the one or more continuous conductive elements 50a (see FIGS. 1A, 5), routed along the raceway 18. The routing of the one or more conductive elements 50, such as the one or more continuous conductive elements 50a, along the raceway 18 is meant to also allow for not having to route to the crown area 46, but may be optionally routed to the crown area 46, if desired. The one or more access openings 40 further provide access to the underfloor area 52 (see FIG. 1B) located below the cabin 48, such as the passenger cabin 48a, in the aircraft 16, for the one or more conductive elements 50, such as the one or more continuous conductive elements 50a (see FIGS. 1A, 5), routed along the raceway 18.

The raceway body 24 may comprise two or more raceway body (RB) sections 54 (see FIGS. 1A, 8A) aligned adjacent to each other, or configured to be aligned adjacent to each other, in the longitudinal fore-aft alignment 56 (see FIGS. 1A, 8A). When the raceway body 24 of the raceway 18 comprises two or more raceway body sections 54, the one or more access openings 40 are preferably formed between end portions 58 (see FIGS. 1A, 8A) of adjacent raceway body sections 54a (see FIGS. 1A, 8A).

As shown in FIG. 1A, a closeout area 142 (see also FIG. 9B), or space, is formed between the interior side 19a of the raceway 18, and the first cover side 108 of the raceway cover 90, when the raceway cover assembly 10 is removably coupled to the raceway 18. The closeout area 142 is configured to house and protect, and houses and protects, the one or more conductive elements 50, such as the one or more short length conductive elements 50b, retained by the raceway cover 90, and the one or more conductive elements 50, such as the one or more continuous conductive elements 50a, routed along the raceway 18. In addition, the raceway cover 90 prevents moisture and debris from falling inside or entering the closeout area 142. A cross-sectional area 144 (see FIG. 1A) of the closeout area 142 is sufficiently large to house the one or more conductive elements 50 and sufficiently small to provide effective support and bundling of the one or more conductive elements 50. Preferably, the cross-sectional area 144 has a height in a range of about 0.5 (one-half) inch to about 5.0 (five) inches. However, the cross-sectional area 144 may also have another suitable height.

Figure 8C:
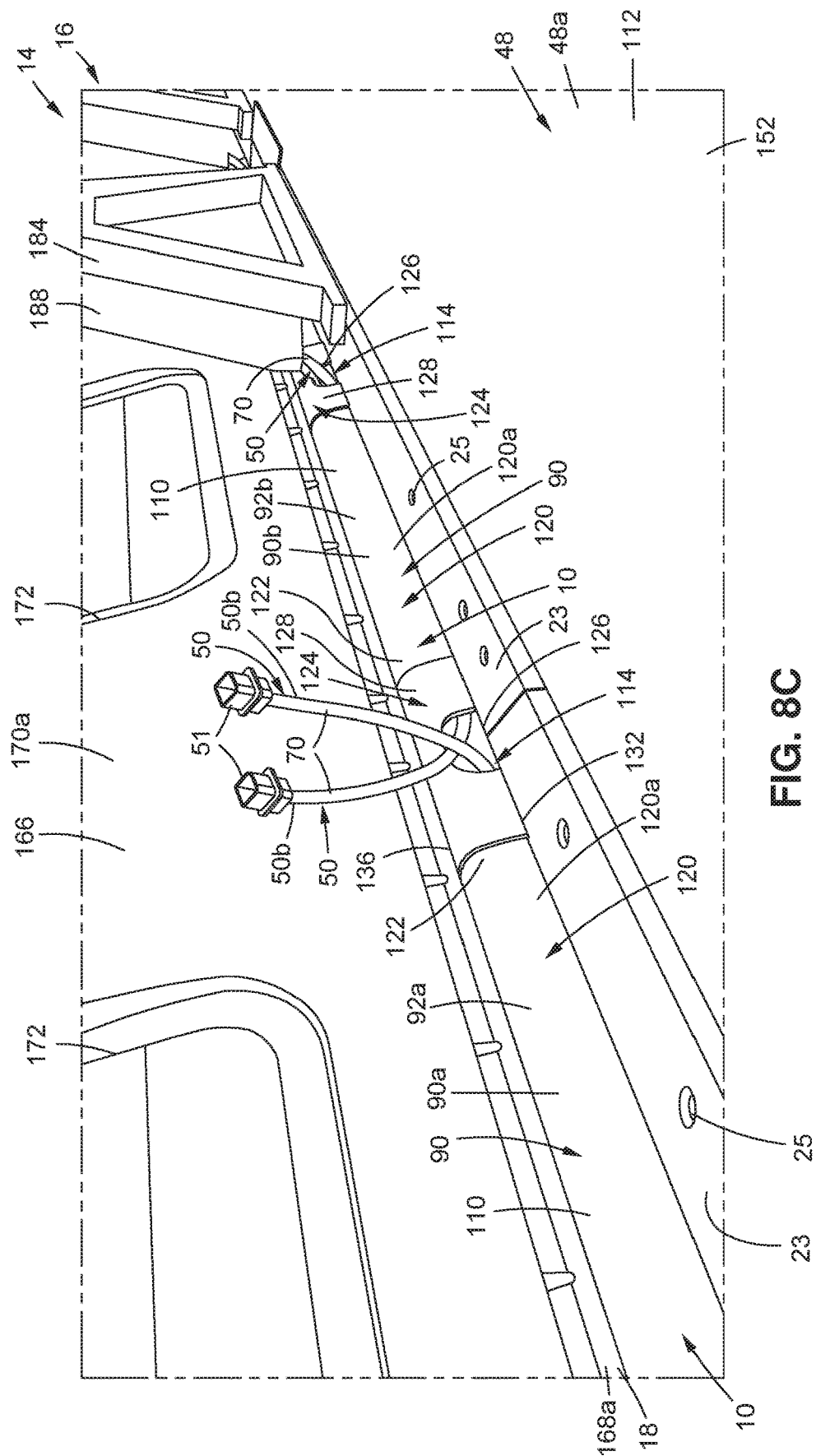
FIG. 8C is an illustration of an inboard side perspective close-up view of a breakout cover coupled between the two raceway cover assemblies of FIG. 8B.

Optionally, one or more breakout covers (BCs) 124 (see FIGS. 1A, 3A, 8C) may be positioned between two or more raceway cover sections 120 (see FIG. 8C) and removably coupled, or attached, to the raceway 18 (see FIGS. 1A, 3A, 8C). The one or more access openings 114 (see FIGS. 1A, 8C) may be in the form of one or more breakout cover (BC) openings 126 (see FIGS. 1A, 3A, 8C) formed in and through the one or more breakout covers 124. In this version, the access openings 114 are not through the raceway cover sections 120 but are through the breakout covers 124 aligned in-between the raceway cover sections 120, and are in the form of the breakout cover openings 126 for routing the one or more conductive elements 50 (see FIGS. 1A, 3A, 8C), such as the one or more short length conductive elements 50b (see FIGS. 1A, 8C), out of the raceway cover assembly 10 and into the interior 112 (see FIGS. 1B, 8C) of the cabin 48 (see FIGS. 1B, 8C) and the overfloor area 116 (see FIG. 1B) in the cabin 48.

In one version, the breakout cover 124 comprises a snap-in breakout cover (BC) 128 (see FIGS. 1A, 8C). The breakout cover 124, such as in the form of the snap-in breakout cover 128, is installed via a breakout cover snap-in installation 130 (see FIG. 1A). The breakout cover 124, such as in the form of the snap-in breakout cover 128, has a bottom end 132 (see FIGS. 1A, 8C), and has tab members 134 (see FIG. 1A) located near the bottom end 132 that may be configured to couple, and may couple, to the raceway track portion 23 (see FIGS. 1A, 8C) of the raceway 18. The breakout cover 124, such as in the form of the snap-in breakout cover 128, further has a top end 136 (see FIGS. 1A, 8C) that is configured to slide under and abut against an underside 43 (see FIGS. 1A, 9B) of the flange portions 42 (see FIGS. 1A, 9B) of the raceway 18 (see FIGS. 1A, 9B). The breakout cover 124, such as in the form of the snap-in breakout cover 128, is easily removably coupled to the raceway 18, and is easily removable from the raceway 18, and that does not require any additional fastener elements 104 (see FIG. 1A) to couple or attach the breakout cover 124 to the raceway 18.

In another version, the breakout cover 124 may comprise a fastened breakout cover 138 (see FIG. 1A) that may be fastened to the raceway 18 with one or more fastener elements 104 (see FIG. 1A), such as bolts, screws, clips, or other suitable fastener elements.

The raceway cover assembly 10, the raceway 19, and the closeout area 142 form a sidewall closeout area assembly 12 (see FIG. 1A). The sidewall closeout area assembly 12 may optionally include the breakout cover 124 (see FIG. 1A). The sidewall closeout area assembly 12 facilitates accessibility to the one or more conductive elements 50. In addition, the sidewall closeout area assembly 12 provides a routing path 86 (see FIG. 1A) for the one or more conductive elements 50 that does not need to be reconfigured for different aircraft cabin layouts 87 (see FIG. 1A). The sidewall closeout area assembly 12 provides a systems routing 88 (see FIG. 1A) for the one or more conductive elements 50, for example, the one or more electrical runs 70, or the one or more systems transport elements 85, through the cabin 48, such as the passenger cabin 48a, of the vehicle 14, such as the aircraft 16.

In addition, the sidewall closeout area assembly 12 (see FIG. 1A) has the advantage of improving a bend radius 194 (see FIG. 1A) of the one or more conductive elements 50 (see FIG. 1A), for example, wires 60 (see FIG. 1A) and cables 62 (see FIG. 1A), by allowing the wires 60 and cables 62 to bend or turn more easily out of the access openings 40 (see FIG. 1A), the intermittent routing breakouts 139 (see FIG. 1A), and the access openings 114 (see FIG. 1A), including the breakout cover openings 126 (see FIG. 1A), to the crown area 46 (see FIG. 1B), to the underfloor area 52 (see FIG. 1B), to the interior 112 (see FIG. 1B) of the cabin 48 (see FIG. 1B), to the overfloor area 116 (see FIG. 1B), to the seat shroud 188 (see FIG. 1B), and/or to the seat legs 184 (see FIG. 1B).

The sidewall closeout area assembly 12 preferably has a modular design 146 (see FIG. 1A) that allows the sidewall closeout area assembly 12 to be easily configured to accommodate any aircraft layout. The sidewall closeout area assembly 12 is installed in and makes use of an unused volume 148 (see FIG. 1A) of the vehicle 14, such as the aircraft 16, and eliminates the congestion of wires 60 (see FIG. 1A) and cables 62 (see FIG. 1A), or other conductive elements 50, on the overfloor area 116 (see FIG. 1B) of the cabin 48 (see FIG. 1B). The sidewall closeout area assembly 12 provides for a floor penetration elimination 150 (see FIG. 1A) of unnecessary floor penetrations or holes 151 (see FIG. 2B) through a floor 152 (see FIG. 1B) or a ceiling 153 (see FIG. 1B) of the cabin 48. The sidewall closeout area assembly 12 further provides for variability elimination 154 (see FIG. 1A) in design and installation of systems routing 88 (see FIG. 1A) in the vehicle 14, such as the aircraft 16, and provides a functional electrical conduit 156 (see FIG. 1A) through a length 158 (see FIG. 1B) of the cabin 48.

The raceway 18, the raceway cover 90, and the breakout cover 124 are preferably made of one or more nonconductive materials 140 (see FIG. 1A). Some exemplary nonconductive materials 140 that may be used include composite materials, such as high performance thermoplastics, fiber reinforced plastics, and other types of rigid plastic materials, for example, polyetherketoneketone (PEKK), polyetheretherketone (PEEK), polyvinyl fluoride (PVF), or another suitable rigid plastic material. The raceway 18 may also be made of a metal material or another suitable material.

Now referring to FIG. 1B, in another version of the disclosure, there is provided the sidewall closeout area cartridge system 11 for installing one or more conductive elements 50 a vehicle 14, such as an aircraft 16. As shown in FIG. 1B, the sidewall closeout area cartridge system 11 comprises the raceway 18, which is configured to attach, and attaches, to a sidewall assembly 26 for use in an interior 112 of the cabin 48, such as the passenger cabin 48a, of the vehicle 14, such as the aircraft 16. The raceway 18 (see FIGS. 1A-1B) has the interior side 19a (see FIG. 1A) and the exterior side 19b (see FIG. 1A). The interior side 19a is configured to face, and faces, the first cover side 108 of the raceway cover 90 (see FIGS. 1A-1B), when the raceway cover 90 is removably coupled to the raceway 18, via a snap-in installation 94 (see FIG. 1A). The exterior side 19b is configured to face, and faces, the interior frame 38 (see FIGS. 1B, 3B) of the aircraft 16 (see FIG. 1B), when the raceway 18 is coupled or attached to the sidewall assembly 26 in the aircraft 16. The sidewall assembly 26 (see FIG. 1B) is configured for installation, and is installed, in the interior 112 (see FIG. 1B) of the cabin 48 (see FIG. 1B), such as the passenger cabin 48a (see FIG. 1B), of the vehicle 14, such as the aircraft 16.

As shown in FIG. 1B, the sidewall closeout area cartridge system 11 further comprises the raceway cover assembly 10. The raceway cover assembly 10 comprises the raceway cover 90 (see FIGS. 1A-1B) removably coupled to the raceway 18. The raceway cover 90 has the first cover side 108 facing the interior side 19a (see FIG. 1A) of the raceway 18, and facing the second side 36 (see FIG. 1A) of the raceway body 24 (see FIG. 1A), when the raceway cover 90 is coupled, or attached, to the raceway 18. The raceway cover 90 (see FIG. 1B) further has the second cover side 110 (see FIG. 1B) configured to face, and facing, the interior 112 of the cabin 48, such as the passenger cabin 48a, when the raceway cover 90 is coupled, or attached, to the raceway 18 in the vehicle 14, such as the aircraft 16. The raceway cover 90 (see FIG. 1B) further has one or more retaining elements 95 (see FIG. 1B) disposed on the first cover side 108. The sidewall closeout area cartridge system 11 further comprises the one or more conductive elements 50 (see FIG. 1B) coupled and retained to the first cover side 108, with the one or more retaining elements 95.

The raceway cover assembly 10 (see FIG. 1B) and the raceway 18 (see FIG. 1B) are preferably assembled together at a location 200 (see FIG. 1B) off of the vehicle 14 (see FIG. 1B), such as the aircraft 16 (see FIG. 1B), to form the sidewall closeout area cartridge system 11, prior to installing the sidewall closeout area cartridge system 11 having the one or more conductive elements 50 (see FIG. 1B) in the vehicle 14, such as the aircraft 16. This allows for routing of the one or more conductive elements 50 in the sidewall closeout area cartridge system 11 at the location 200 off of the aircraft 16.

The sidewall closeout area cartridge system 11 (see FIG. 1B) is configured for installation, and is installed, via an attached installation 198 (see FIG. 1B) in the cabin 48, such as the passenger cabin 48a, of the vehicle 14, such as the aircraft 16, between an air grille panel 166 (see FIG. 1B) of the sidewall assembly 26 (see FIG. 1B) and an aircraft floor structure 32 (see FIG. 1B). As shown in FIG. 1B, the aircraft floor structure 32 may comprise one or more of, a fore-aft longitudinal floor grid structure 176, a longitudinal seat track 178, a floor panel 180, or another suitable aircraft floor structure.

As discussed above, the one or more conductive elements 50 of the sidewall closeout area cartridge system 11 comprise, as shown in FIG. 1A, one or more of, wires 60, cables 62 including electrical cables 62a, data bus cables 62b, high speed transmission cables 62c, coaxial cables 62d, and fiber optic cables 62e, printed circuit boards (PCBs) 64, tubes 66, and capacitors 68. In addition, the one or more conductive elements 50 of the sidewall closeout area cartridge system 11 comprise, as shown in FIG. 1A, one or more electrical runs 70 comprising one or more of, power runs 72, data runs 74, lighting system runs 76, and seat system runs 78, including in-flight entertainment (IFE) system runs 80, seat actuation runs 82, and personal electronic device (PED) runs 84, and comprise one or more systems transport elements 85 comprising one or more of, pneumatic lines 85a, air lines 85b, fluid lines 85c, and water lines 85d.

For the one or more conductive elements 50 (see FIG. 1A-1B), such as the one or more continuous conductive elements 50a (see FIG. 1B), that are routed along the raceway 18, the raceway 18 preferably has access openings 40 (see FIGS. 1A, 8A) that provide access for the one or more conductive elements 50, such as the one or more continuous conductive elements 50a, to one or more of, the crown area 46 (see FIGS. 1B, 2A) above the ceiling 153 (see FIGS. 1B, 2A) of the cabin 48 (see FIGS. 1B, 2A), the underfloor area 52 (see FIGS. 1B, 2A) below the floor 152 (see FIGS. 1B, 2A) of the cabin 48, or another area of the cabin 48. For the one or more conductive elements 50 (see FIG. 1A-1B), such as the one or more short length conductive elements 50b (see FIG. 1B), that are retained in the raceway cover 90, an intermittent routing breakout 139 (see FIGS. 1A, 6C, 8B) between raceway covers 90 (see FIG. 8B) of two raceway cover assemblies 10 (see FIG. 8B), or a breakout cover opening 126 (see FIG. 8C) in a breakout cover 124 (see FIG. 8B) coupled between the raceway covers 90 (see FIG. 8C) of the two raceway cover assemblies 10 (see FIG. 8C), provide access for the one or more conductive elements 50 to the overfloor area 116 (see FIG. 1B) in the cabin 48, to the seats 182 (see FIG. 1B) in the cabin 48, or to another area in the interior 112 of the cabin 48.

As shown in FIG. 1B, the sidewall closeout area cartridge system 11, or a plurality of sidewall closeout area cartridge systems 11a, may be attached to one or more air grille panels 166 of the sidewall assembly 26, to form an air grille panel cartridge assembly 13, or a plurality of air grille panel cartridge assemblies 13a. The air grille panel cartridge assembly 13, or the plurality of air grille panel cartridge assemblies 13a, may be assembled at the location 200 (see FIG. 1B) off of the vehicle 14, such as the aircraft 16, and each air grille panel cartridge assembly 13 is configured for installation, and installed, in the cabin 48, such as the passenger cabin 48a, between a sidewall panel 160 (see FIG. 1B) of the sidewall assembly 26 (see FIG. 1B) and an aircraft floor structure 32 (see FIG. 1B).

As shown in FIG. 1B, the sidewall assembly 26 comprises the bottom portion 28 (see also FIG. 3A) and the top portion 29 (see also FIG. 3A). As shown in FIG. 1B, the sidewall assembly 26 further comprises one or more sidewall panels 160 (see FIG. 1B). Each sidewall panel 160 (see FIGS. 1B, 3A) has a bottom end 162a (see FIGS. 1B, 3A) and a top end 162b (see FIGS. 1B, 3A), and an interior side 164a (see FIGS. 1B, 3A) and an exterior side 164b (see FIG. 1B). Each sidewall panel 160 is coupled or attached to one or more air grille panels 166 (see FIGS. 1B, 3A). Each air grille panel 166 has a bottom end 168a (see FIGS. 1B, 3A) and a top end 168b (see FIGS. 1B, 3A), and an interior side 170a (see FIGS. 1B, 3A) and an exterior side 170b (see FIG. 1B). Each air grille panel 166 has one or more air grille openings 172 (see FIGS. 1B, 3A). An air grille 174 (see FIGS. 1B, 9C) is fitted and retained within each air grille opening 172. The first end 20 of the raceway 18 is configured to attach, and attaches, to the bottom end 168a of each of the air grille panels 166 of the sidewall assembly 26. The air grille panels 166 may also be referred to as decompression panels or decompression grilles or air vents.

As further shown in FIG. 1B, the vehicle 14, such as the aircraft 16, includes in the cabin 48, such as the passenger cabin 48a, a plurality of seats 182 for passengers. The seats 182 may be in the form of palletized seats 182a that are reconfigurable to change seat pitches of the seats 182, and that are reconfigurable along the longitudinal seat tracks 178. As further shown in FIG. 1B, the seats 182 have seat legs 184, seat track covers 186 to cover the longitudinal seat tracks 178, and seat shrouds 188. In addition to the raceway cover 90 (see FIGS. 1A-1B) that preferably prevents moisture and debris from falling inside or entering the closeout area 142 (see FIG. 1A) of the sidewall closeout area assembly 12, the aircraft 16 may include a mopsill 190 (see FIG. 1B) and a seal 192 (see FIG. 1B), such as a bulb seal, to facilitate routing any moisture and debris out of the bottom portion 28 (see FIG. 1A) of the sidewall assembly 26 (see FIG. 1A) and away from interior of the sidewall closeout area assembly 12. The mopsill 190 may run on the outboard side of the floor panel 180 (see FIG. 1B) and also provides a drain guide.

Now referring to FIG. 2A, FIG. 2A is an illustration of a back cross-sectional view of a cabin 48, such as a passenger cabin 48a, of a vehicle 14, such as an aircraft 16, showing a routing path 86 for the one or more conductive elements 50 (see FIG. 1A) accessing a crown area 46 and accessing an underfloor area 52, via the sidewall closeout area assembly 12, which includes the raceway cover assembly 10 (see FIG. 1A) and the raceway 18 (see FIG. 1A). As shown in FIG. 2A, the cabin 48 has a floor 152, a ceiling 153, seats 182 with seat legs 184, the sidewall assembly 26 with the sidewall panel 160 and the air grille panel 166, and the sidewall closeout area assembly 12, in the interior 112 of the cabin 48. As shown in FIG. 2A, the routing path 86 runs along the interior frame 38 of the aircraft 16 from the sidewall closeout area assembly 12 to the crown area 46 of the aircraft 16. The routing of the one or more conductive elements 50 is meant to also allow for not having to route to the crown area 46, but may be optionally routed to the crown area 46, if desired. As further shown in FIG. 2A, the routing path 86 runs from the sidewall closeout area assembly 12 to the underfloor area 52 of the aircraft 16 and does not penetrate through the floor 152 of the cabin 48.

Now referring to FIG. 2B, FIG. 2B is an illustration of a back cross-sectional view of a cabin 48, such as a passenger cabin 48a, of a vehicle 14, such as an aircraft 16, showing a known routing path 196 accessing a crown area 46 and accessing an underfloor area 52, via a hole 151 in the floor 152 at an inboard seat leg area 193. FIG. 2B shows the seats 182 with seat legs 184, the sidewall panel 160, and the air grille panel 166 in the interior 112 of the cabin 48. As shown in FIG. 2B, the known routing path 196 runs along the interior frame 38 of the aircraft 16 from the crown area 46 to the inboard seat leg area 193 and penetrates through the floor 152 of the cabin 48 to the underfloor area 52. The known routing path 196 through the floor 152 causes variation in the floor panels 180 (see FIG. 1B), holes 151 in the floor 152, floor covering protrusions, and variation.

Now referring to FIG. 3A, FIG. 3A is an illustration of a front perspective view of a cabin 48, such as a passenger cabin 48a, of a vehicle 14, such as an aircraft 16, showing a version of the raceway cover assembly 10 of the disclosure removably coupled to the raceway 18, where the raceway cover assembly 10 and the raceway 18 form the sidewall closeout area assembly 12. As shown in FIG. 3A, the seats 182 are in the form of palletized seats 182a with one set of seat legs 184 retained in a longitudinal seat track 178 along aircraft floor structures 32 in the form of floor panels 180 forming the floor 152 in the interior 112 of the cabin 48. FIG. 3A shows the raceway 18 coupled, or attached, to the bottom portion 28 of the sidewall assembly 26. FIG. 3A shows the top portion 29 of the sidewall assembly 26 and shows the sidewall assembly 26 comprising sidewall panels 160 with a bottom end 162a, a top end 162b, and an interior side 164a. As shown in FIG. 3A, the sidewall panels 160 are coupled, or attached, to air grille panels 166 having a bottom end 168a, a top end 168b, and an interior side 170a. Each air grille panel 166 has an air grille opening 172 (see FIG. 3A), and preferably, the bottom end 168a of the air grille panels 166 is coupled, or attached, to the raceway 18 of the sidewall closeout area assembly 12. FIG. 3A further shows the breakout cover 124, with the breakout cover opening 126, removably couple to the raceway 18. Two conductive elements 50, such as in the form of electrical runs 70 (see FIG. 3A), each having connector portions 51, are routed out of the breakout cover opening 126.

Figure 3B:
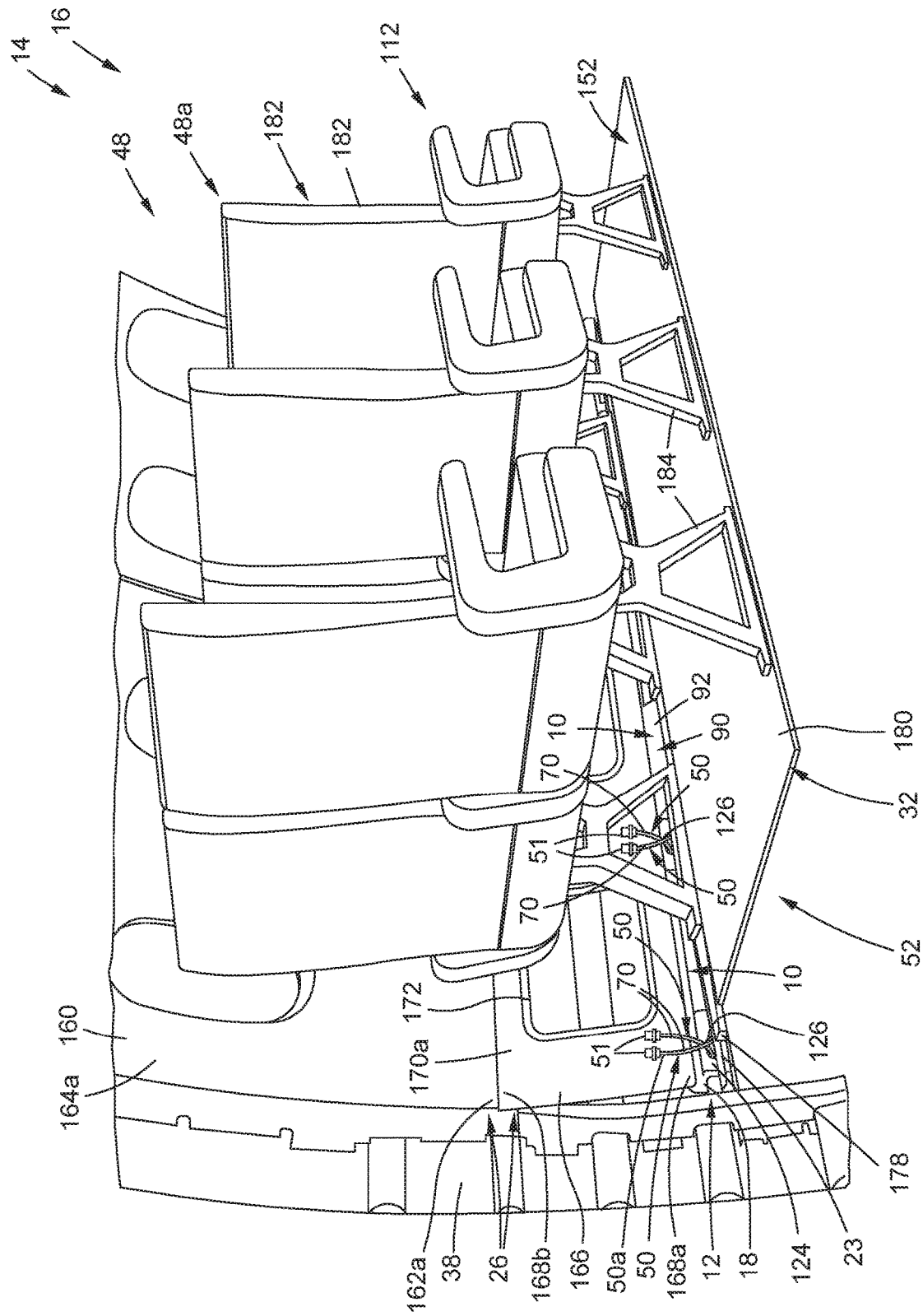
FIG. 3B is an illustration of a back perspective view of the cabin of FIG. 3A showing raceway cover assemblies adjacent breakout covers.

Now referring to FIG. 3B, FIG. 3B is an illustration of a back perspective view of the cabin 48, such as the passenger cabin 48a, of FIG. 3A, of the vehicle 14, such as the aircraft 16, showing raceway cover assemblies 10 adjacent breakout covers 124. FIG. 3B shows the seats 182, such as palletized seats 182a, with one set of seat legs 184 retained in the longitudinal seat track 178 along aircraft floor structures 32 in the form of floor panels 180 forming the floor 152 in the interior 112 of the cabin 48. FIG. 3B further shows the underfloor area 52 under the floor 152 and under the seats 182. FIG. 3B further shows the sidewall closeout area assembly 12 coupled, or attached, to the bottom end 168a of the air grille panels 166 of the sidewall assembly 26.

FIG. 3B further shows the top end 168b, the interior side 170a, and the air grille opening 172 of the air grille panel 166, and shows the top end 168b coupled, or attached, to the bottom end 162a of the sidewall panel 160. FIG. 3B shows the interior side 164a of the sidewall panel 160. FIG. 3B further shows the raceway cover 90, such as in the form of the snap-in raceway cover 92, of the raceway cover assembly 10. The conductive elements 50, such as electrical runs 70, for example, wires 60 (see FIG. 1A) and/or cables 62 (see FIG. 1A), or other conductive elements 50, each having connector portions 51, are routed out of the breakout cover openings 126. A continuous conductive element 50a (see FIG. 3B) is routed along the raceway 18. FIG. 3B further shows the raceway track portion 23 of the raceway 18.

Figure 4C:
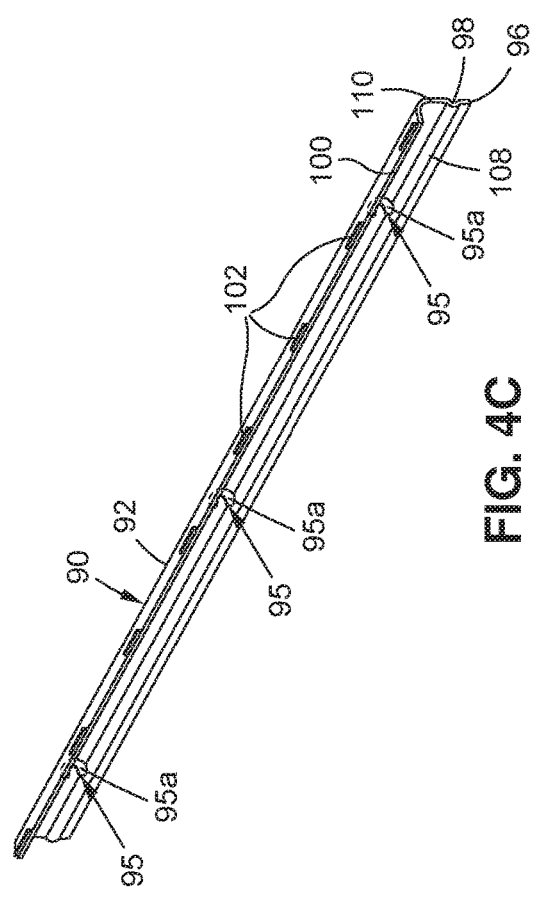
FIG. 4C is an illustration of a perspective side view of a first cover side of the raceway cover of FIG. 4A.

Now referring to FIGS. 4A-4C, FIG. 4A is an illustration of a perspective exploded side view of a version of a raceway cover assembly 10 of the disclosure, showing a second cover side 110 of a raceway cover 90, and a conductive element 50, FIG. 4B is an illustration of a perspective assembled side view of the raceway cover assembly 10 of FIG. 4A, and FIG. 4C is an illustration of a perspective side view of a first cover side 108 of the raceway cover 90 of FIG. 4A. The raceway cover assembly 10 (see FIGS. 4A-4B) integrates the conductive element 50 into the raceway cover 90.

As shown in FIGS. 4A-4C, the raceway cover 90, such as in the form of the snap-in raceway cover 92, comprises the bottom end 96, tab members 98 formed near the bottom end 96, the top end 100, flange elements 102 positioned and spaced along the top end 100, the first cover side 108, and the second cover side 110. As shown in FIG. 4A, the raceway cover 90 comprises a unitary structure 118. However, the raceway cover 90 may comprise another suitable structure.

The raceway cover 90, such as in the form of the snap-in raceway cover 92, does not require any additional fastener elements 104 (see FIG. 1A) to couple, or attach, the raceway cover 90 to the raceway 18 (see FIGS. 1A, 3A). In another version, the raceway cover 90 may comprise a fastened raceway cover 106 (see FIG. 1A) that may be fastened to the raceway 18 (see FIGS. 1A, 3A) and/or to the aircraft floor structure 32 (see FIGS. 1B, 3A) with one or more fastener elements 104 (see FIG. 1A), such as bolts, screws, clips, or other suitable fastener elements.

As shown in FIGS. 4A-4C, the raceway cover 90 further comprises retaining elements 95, such as in the form of clips 95a, disposed on the first cover side 108. Although FIGS. 4A-4C show the retaining elements 95 in the form of clips 95a, coupled to, attached to, or integral with, the first cover side 108, the retaining elements 95 may also comprise clamps 95b (see FIG. 1A), hooks 95c (see FIG. 1A), or other suitable retaining elements, to retain one or more conductive elements 50 along the first cover side 108 of the raceway cover 90.

As shown in FIGS. 4A-4B, the raceway cover assembly 10 comprises the conductive element 50, such as in the form of a short length conductive element 50b, for example, an electrical run 70. Although FIGS. 4A-4B show the conductive element 50 comprising an electrical run 70, the conductive element 50 may also comprise, as shown in FIG. 1A, one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, power runs 72, data runs 74, lighting system runs 76, and seat system runs 78, including in-flight entertainment (IFE) system runs 80, seat actuation runs 82, personal electronic device (PED) runs 84, one or more systems transport elements 85 comprising one or more of, pneumatic lines 85a, air lines 85b, fluid lines 85c, water lines 85d, or other suitable systems transport elements, or another suitable conductive element. As further shown in FIGS. 4A-4B, the conductive element 50 comprises a connector portion 51 coupled, or attached, to a first end 53a of the conductive element 50, and coupled, or attached, to a second end 53b of the conductive element 50.

Figure 5:
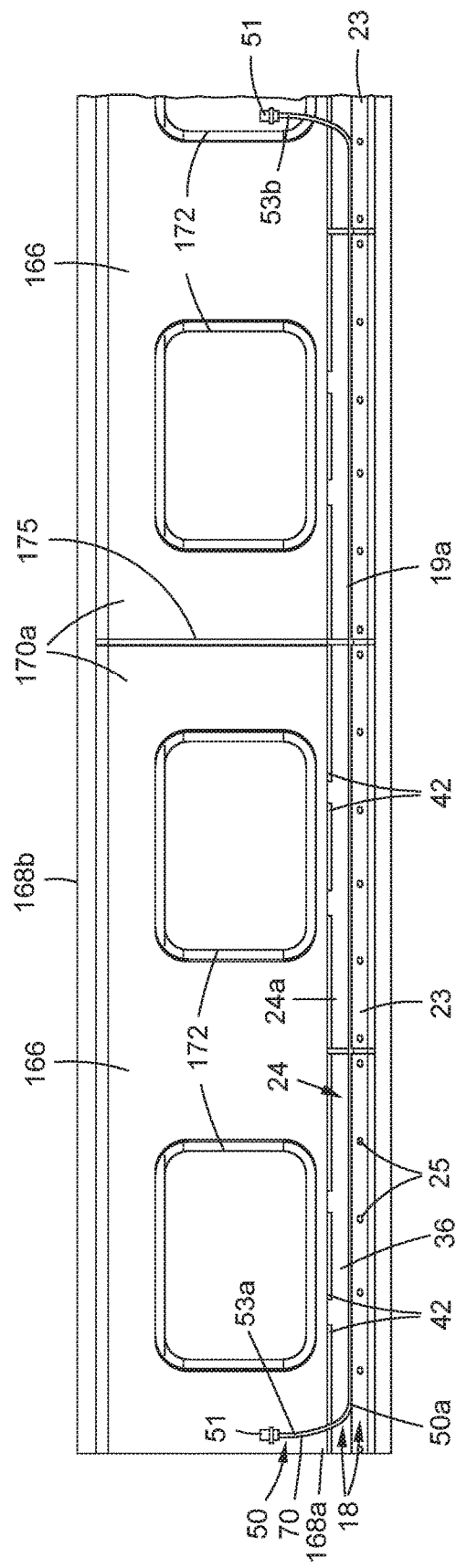
FIG. 5 is an illustration of a side view of a version of a raceway attached to air grille panels, where the raceway has a continuous conductive element routed along the raceway.

FIG. 5 is an illustration of a side view of a version of a raceway 18 attached to the bottom end 168a of the air grille panels 166, where the raceway 18 has a conductive element 50, such as in the form of a continuous conductive element 50a, for example, an electrical run 70, with connector portions 51, routed along the interior side 19a of the raceway 18. FIG. 5 shows a first end 53a and a second end 53b of the conductive element 50. When continuous conductive elements 50a having a long length are required, the raceway 18 may be installed or attached to one or more air grille panels 166, so that the continuous conductive elements 50a may be routed along the raceway 18.

The loose ends of the continuous conductive element 50a (see FIG. 5) with the connector portions 51 (see FIG. 5) may be routed, for example, to the crown area 46 (see FIGS. 1B, 2A) and/or the underfloor area 52 (see FIGS. 1B, 2A). Further, for example, loose ends of the continuous conductive element 50a may connect to an electrical disconnect bracket (not shown) or the raceway 18 may have an integrated connector (not shown) such that when structurally installing the raceway 18 with the continuous conductive element 50a, it would be electrically connected.

One or more short length conductive elements 50b are integrated into the raceway cover 90 of the raceway cover assembly 10, and a plurality of raceway cover assemblies 10a (see FIG. 1A) may be installed by coupling, or attaching, the plurality of raceway cover assemblies 10a to the raceway 18. The service lengths may be stowed. The raceway covers 90 of the raceway cover assemblies 10 preferably each have a length based on how far apart the seats 182 (see FIG. 1B) are configured in the cabin 48. For example, the raceway cover 90 may have a length 119 (see FIG. 1A) in a range of from 28 inches to 36 inches (e.g., in economy class), may have a length 119 in a range of from 36 inches to 42 inches (e.g., business class), may have a length 119 in a range of from 42 inches to 64 inches (e.g., first class), or may have another suitable length.

As shown in FIG. 5, the raceway 18 comprises the raceway body 24, such as in the form of elongated raceway body 24a, having a second side 36. As shown in FIG. 5, the raceway 18 further comprises flange portions 42, and the raceway track portion 23 with openings 25. FIG. 5 further shows the top end 168b and air grille openings 172 of the air grille panels 166. As shown in FIG. 5, the raceway 18 spans across a gap 175 between the air grille panels 166.

Now referring to FIGS. 6A-6C, FIG. 6A is an illustration of a side view of a version of a raceway cover assembly 10 removably coupled to the raceway 18 of FIG. 5, FIG. 6B is an illustration of a side view of a version of two raceway cover assemblies 10 removably coupled to the raceway 18 of FIG. 5, and FIG. 6C is an illustration of a side view of a version of three raceway cover assemblies 10 removably coupled to the raceway 18 of FIG. 5.

As shown in FIGS. 6A-6C, the raceway 18 is attached to the air grille panels 166, and the raceway 18 has the conductive element 50, such as in the form of the continuous conductive element 50a, for example, an electrical run 70, having the connector portions 51, and a first end 53a and a second end 53b, routed along the interior side 19a of the raceway 18. As shown in FIGS. 6A-6C, the raceway 18 comprises the flange portions 42 and the raceway track portion 23, and the air grille panels 166 include the air grille openings 172. As further shown in FIGS. 6A-6C, the raceway 18 spans across the gap 175 between the air grille panels 166. The sidewall closeout area assembly 12 (see FIGS. 6A-6C) comprises the raceway cover assembly 10 (see FIGS. 6A-6C) removably coupled to the raceway 18 (see FIGS. 6A-6C).

FIG. 6A shows one raceway cover assembly 10 removably coupled to the raceway 18, via a snap-in installation 94. As shown in FIG. 6A, the raceway cover assembly 10 comprises a first raceway cover 90a, such as in the form of a first snap-in raceway cover 92a, retaining a conductive element 50, such as a short length conductive element 50b, for example, an electrical run 70, having the connector portions 51, and a first end 53a and a second end 53b.

FIG. 6B shows a plurality of raceway cover assemblies 10a, comprising two raceway cover assemblies 10 removably coupled to the raceway 18, via a snap-in installation 94. As shown in FIG. 6B, the two raceway cover assemblies 10 comprise the first raceway cover 90a, such as in the form of the first snap-in raceway cover 92a, and a second raceway cover 90b, such as in the form of a second snap-in raceway cover 92b, in a longitudinal fore-aft alignment 56. As shown in FIG. 6B, the first raceway cover 90a and the second raceway cover 90b each retains a conductive element 50, such as a short length conductive element 50b, for example, an electrical run 70, having the connector portions 51, and a first end 53a and a second end 53b. An intermittent routing breakout 139 (see FIG. 6B) is formed between the two raceway cover assemblies 10.

FIG. 6C shows a plurality of raceway cover assemblies 10a, comprising three raceway cover assemblies 10 removably coupled to the raceway 18, via a snap-in installation 94. As shown in FIG. 6C, the three raceway cover assemblies 10 comprise the first raceway cover 90a, such as in the form of the first snap-in raceway cover 92a, and the second raceway cover 90b, such as in the form of the second snap-in raceway cover 92b, and a third raceway cover 90c, such as in the form of a third snap-in raceway cover 92c, all in a longitudinal fore-aft alignment 56. As shown in FIG. 6C, the first raceway cover 90a, the second raceway cover 90b, and the third raceway cover 90c, each retains a conductive element 50, such as a short length conductive element 50b, for example, an electrical run 70, having the connector portions 51, and a first end 53a and a second end 53b. Intermittent routing breakouts 139 (see FIG. 6C) are formed between the three raceway cover assemblies 10.

The loose ends of the short length conductive elements 50b (see FIG. 6C), with the connector portions 51 (see FIG. 6C), may be routed to an aircraft floor structure 32 (see FIG. 1B) comprising the fore-aft longitudinal floor grid structure 176 (see FIG. 1B), comprising the longitudinal seat track 178 (see FIG. 1B) and to the seats 182 (see FIG. 1B), comprising the floor panel 180 (see FIG. 1B), or another suitable aircraft floor structure, or may be routed to another area of the interior 112 (see FIG. 1B) of the cabin 48 (see FIG. 1B) of the vehicle 14 (see FIG. 1B), such as the aircraft 16 (see FIG. 1B).

Figure 7:
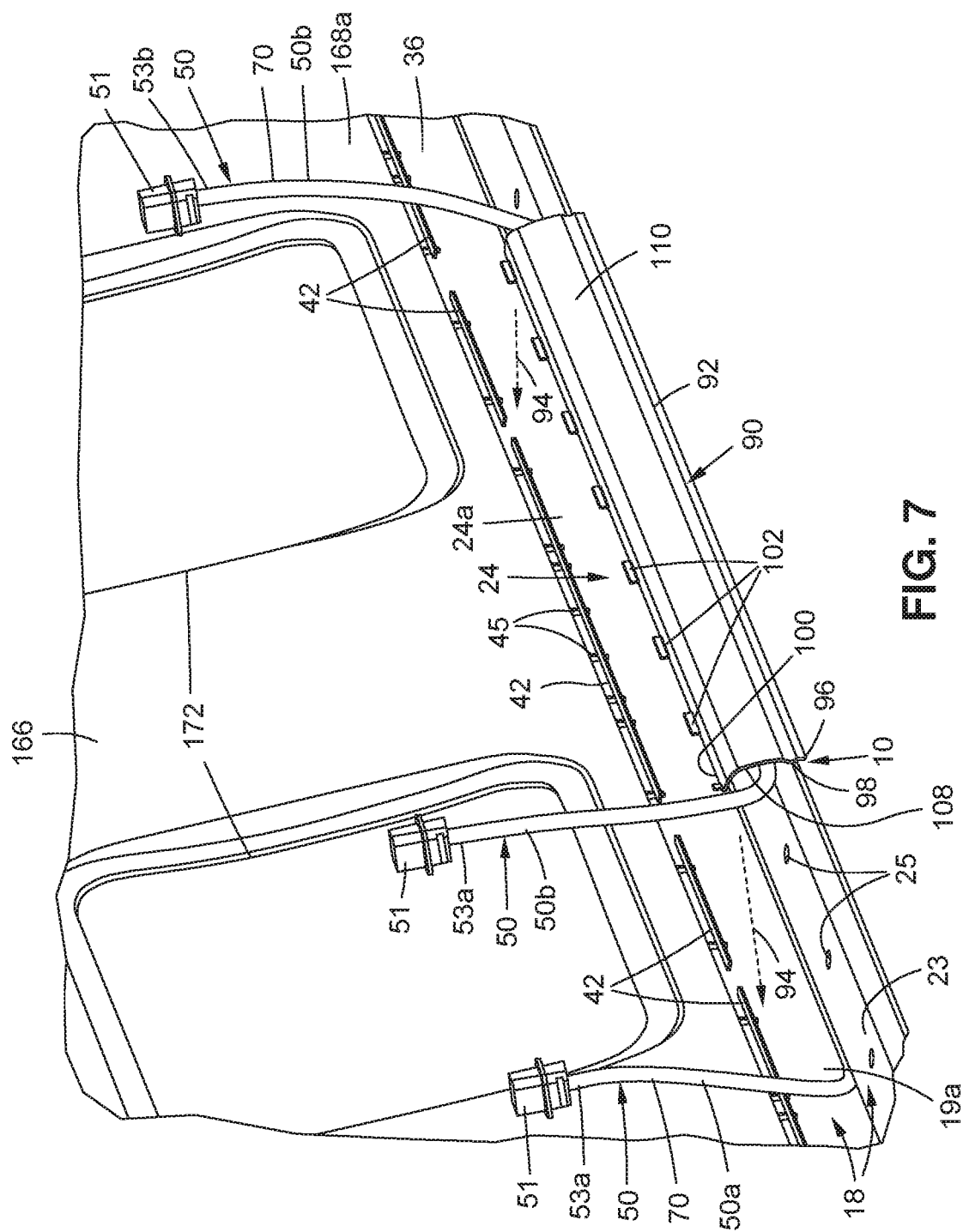
FIG. 7 is an illustration of a perspective side view of a version of a raceway cover assembly being installed, via a snap-in installation, to a raceway, where the raceway is attached to an air grille panel.

Now referring to FIG. 7, FIG. 7 is an illustration of a perspective side view of a version of a raceway cover assembly 10 being installed, via a snap-in installation 94, to a raceway 18, where the raceway 18 is attached to a bottom end 168a of an air grille panel 166. As shown in FIG. 7, the raceway cover assembly 10 comprises the raceway cover 90, such as in the form of the snap-in raceway cover 92, where the raceway cover 90 comprises the bottom end 96, the tab members 98 formed near the bottom end 96, the top end 100, the flange elements 102 positioned and spaced along the top end 100, the first cover side 108, and the second cover side 110. As shown in FIG. 7, the raceway cover assembly 10 further comprises the conductive element 50, such as in the form of the short length conductive element 50b, for example, an electrical run 70, retained by the raceway cover 90. The conductive element 50, such as in the form of the short length conductive element 50b, has the connector portions 51 at the first end 53a and as the second end 53b of the short length conductive element 50b.

FIG. 7 shows the raceway 18 comprising the raceway body 24, such as in the form of the elongated raceway body 24a, having a second side 36, and comprising flange portions 42, fin portions 45, and the raceway track portion 23 with openings 25. As shown in FIG. 7, the raceway 18 has a conductive element 50, such as in the form of a continuous conductive element 50a, for example, an electrical run 70, with connector portions 51, routed along the interior side 19a of the raceway 18. FIG. 7 further shows the air grille openings 172 of the air grille panels 166.

Now referring to FIG. 8A, FIG. 8A is an illustration of inboard side perspective close-up view of a version of raceways 18 attached between an air grille panel 166 and a floor 152 in an interior 112 of a cabin 48, such as a passenger cabin 48a, of a vehicle 14, such as an aircraft 16. FIG. 8A shows the interior side 19a of the raceways 18, shows the second side 36 of the raceway body 24, such as in the form of the elongated raceway body 24a, and shows the raceway track portion 23 with openings 25. FIG. 8A further shows adjacent raceway body sections 54a aligned in a longitudinal fore-aft alignment 56 adjacent to each other. An access opening 40 (see FIG. 8A) is formed between end portions 58 of each adjacent raceway body section 54a. FIG. 8A further shows the interior side 170a and the air grille openings 172 of the air grille panel 166, and shows the seat leg 184 and the seat shroud 188.

Now referring to FIG. 8B, FIG. 8B is an illustration of an inboard side perspective close-up view of two raceway cover assemblies 10 attached to the raceways 18 of FIG. 8A. As shown in FIG. 8B, the raceways 18 are attached between the bottom end 168a of the air grille panel 166 and the floor 152 in the interior 112 of the cabin 48, such as the passenger cabin 48a, of the vehicle 14, such as the aircraft 16. FIG. 8B shows the raceway track portions 23 with openings 25.

FIG. 8B shows the second cover side 110 of the first raceway cover 90a, such as in the form of the first snap-in raceway cover 92a, and the second raceway cover 90b, such as in the form of the second snap-in raceway cover 92b. As shown in FIG. 8B, the raceway covers 90 comprise raceway cover sections 120, such as in the form of adjacent raceway cover sections 120a, aligned in a longitudinal fore-aft alignment 56, where end portions 122 of the raceway cover sections 120 are adjacent the intermittent routing breakout 139. FIG. 8B further shows the raceway covers 90 facing the interior 112 of the cabin 48, and facing the seat shroud 188 and the seat leg 184. FIG. 8B further shows a closeout area 142 formed between the raceways 18 and the raceway covers 90. FIG. 8B further shows the interior side 170a and the air grille openings 172 of the air grille panel 166.

As further shown in FIG. 8B, each raceway cover assembly 10 comprises the conductive element 50, such as in the form of the short length conductive element 50b, for example, the electrical run 70, retained by the raceway cover 90. As shown in FIG. 8B, each conductive element 50, such as in the form of the short length conductive element 50b, has the connector portion 51.

Now referring to FIG. 8C, FIG. 8C is an illustration of an inboard side perspective close-up view of a breakout cover 124 coupled between the raceway cover assemblies 10 of FIG. 8B. As shown in FIG. 8C, the raceway 18 is attached between the bottom end 168a of the air grille panel 166 and the floor 152 in the interior 112 of the cabin 48, such as the passenger cabin 48a, of the vehicle 14, such as the aircraft 16. FIG. 8C shows the raceway track portions 23 with openings 25.

FIG. 8C shows the second cover side 110 of the first raceway cover 90a, such as in the form of the first snap-in raceway cover 92a, and the second raceway cover 90b, such as in the form of the second snap-in raceway cover 92b. As shown in FIG. 8C, the raceway covers 90 comprise the raceway cover sections 120, such as in the form of the adjacent raceway cover sections 120a, where the end portions 122 of the raceway cover sections 120 are adjacent the breakout cover 124, such as in the form of a snap-in breakout cover 128. FIG. 8C shows another breakout cover 124, such as in the form of a snap-in breakout cover 128, on the other end of the second raceway cover 90b. As shown in FIG. 8C, each breakout cover 124 comprises an access opening 114, such as in the form of a breakout cover opening 126, and comprises a bottom end 132 and a top end 136. Both the raceway covers 90 and the breakout covers 124 are removably coupled, such as snap fitted, to the raceway 18, and positioned between the bottom end 168a of the air grille panel 166, and the floor 152 of the cabin 48. FIG. 8C further shows the raceway covers 90 and the breakout covers 124 facing the interior 112 of the cabin 48, and facing the seat shroud 188 and the seat leg 184. FIG. 8C further shows the interior side 170a and the air grille openings 172 of the air grille panel 166.

As further shown in FIG. 8C, each raceway cover assembly 10 comprises the conductive element 50, such as in the form of the short length conductive element 50b, for example, the electrical run 70, retained by the raceway cover 90. As shown in FIG. 8C, each conductive element 50, such as in the form of the short length conductive element 50b, has the connector portion 51. FIG. 8C further shows a conductive element 50, such as an electrical run 70, routed into the seat shroud 188.

Now referring to FIGS. 9A-9B, FIG. 9A is an illustration of a perspective exploded side view of a version of a sidewall closeout area cartridge system 11 of the disclosure, showing a raceway cover assembly 10 and a raceway 18, and FIG. 9B is an illustration of a perspective assembled side view of the sidewall closeout area cartridge system 11 of FIG. 9A. In this version, the conductive element 50 retained by the raceway cover 90 is integrated with the raceway 18 and installed as a unit in the cabin 48 of the vehicle 14, such as the aircraft 16.

As shown in FIGS. 9A-9B, the raceway cover assembly 10 comprises the raceway cover 90, such as in the form of the snap-in raceway cover 92. As shown in FIG. 9A, the raceway cover 90 comprises the bottom end 96, the tab members 98 formed near the bottom end 96, the top end 100, the flange elements 102 positioned and spaced along the top end 100, the first cover side 108, and the second cover side 110 (see also FIG. 9B).

The raceway cover 90 (see FIGS. 9A-9B) retains the conductive element 50 (see FIGS. 9A-9B), such as the short length conductive element 50b (see FIGS. 9A-9B), for example, the electrical run 70 (see FIGS. 9A-9B). The conductive element 50 (see FIGS. 9A-9B) has the connector portion 51 (see FIGS. 9A-9B) at the first end 53a (see FIGS. 9A-9B) and the second end 53b (see FIGS. 9A-9B) of the conductive element 50. Although FIGS. 9A-9B show the conductive element 50 comprising the electrical run 70, the conductive element 50 may also comprise, as shown in FIG. 1A, one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, power runs 72, data runs 74, lighting system runs 76, and seat system runs 78, including in-flight entertainment (IFE) system runs 80, seat actuation runs 82, personal electronic device (PED) runs 84, one or more systems transport elements 85 comprising one or more of, pneumatic lines 85a, air lines 85b, fluid lines 85c, water lines 85d, or other suitable systems transport elements 85, or another suitable conductive element.

As further shown in FIG. 9A, the raceway 18 has the interior side 19a and the exterior side 19b, and the first cover side 108 of the raceway cover 90 is configured to face, and faces, the interior side 19a of the raceway 18, when the raceway cover assembly 10 is coupled, or attached to the raceway 18, via the snap-in installation 94. As further shown in FIG. 9A, the raceway 18 comprises the raceway body 24, such as the elongated raceway body 24a, having the first side 34, or exterior side, and the second side 36, or interior side, where the second side 36 of the raceway body 24 is configured to face, and faces, the first cover side 108 of the raceway cover 90.

As shown in FIGS. 9A-9B, the raceway 18 further comprises a first end 20, a second end 21, the raceway track portion 23 with openings 25, the flange portions 42, and the fin portions 45. As shown in FIGS. 9A-9B, the flange portions 42 have an underside 43, where the top end 100 of the raceway cover 90 is adjacent to, or abuts, the underside 43 of the flange portions 42, when the raceway cover assembly 10 is coupled to the raceway 18.

As shown in FIG. 9B, when the raceway cover assembly 10 is coupled, via the snap-in installation 94, to the raceway 18, to form the sidewall closeout area cartridge system 11, the closeout area 142 is formed between the interior side 19a of the raceway 18 and the first cover side 108 of the raceway cover 90. In the version of the raceway cover 90, such as in the form of the snap-in raceway cover 92, shown in FIGS. 9A-9B, no fastener elements 104 (see FIG. 1A) are needed to couple, or attach, the raceway cover 90 to the raceway 18. In another version, the raceway cover 90 may comprise a fastened raceway cover 106 (see FIG. 1A) that may be fastened to the raceway 18 (see FIGS. 1A, 3A) and/or to the aircraft floor structure 32 (see FIGS. 1B, 3A) with one or more fastener elements 104 (see FIG. 1A), such as bolts, screws, clips, or other suitable fastener elements.

Figure 9C:
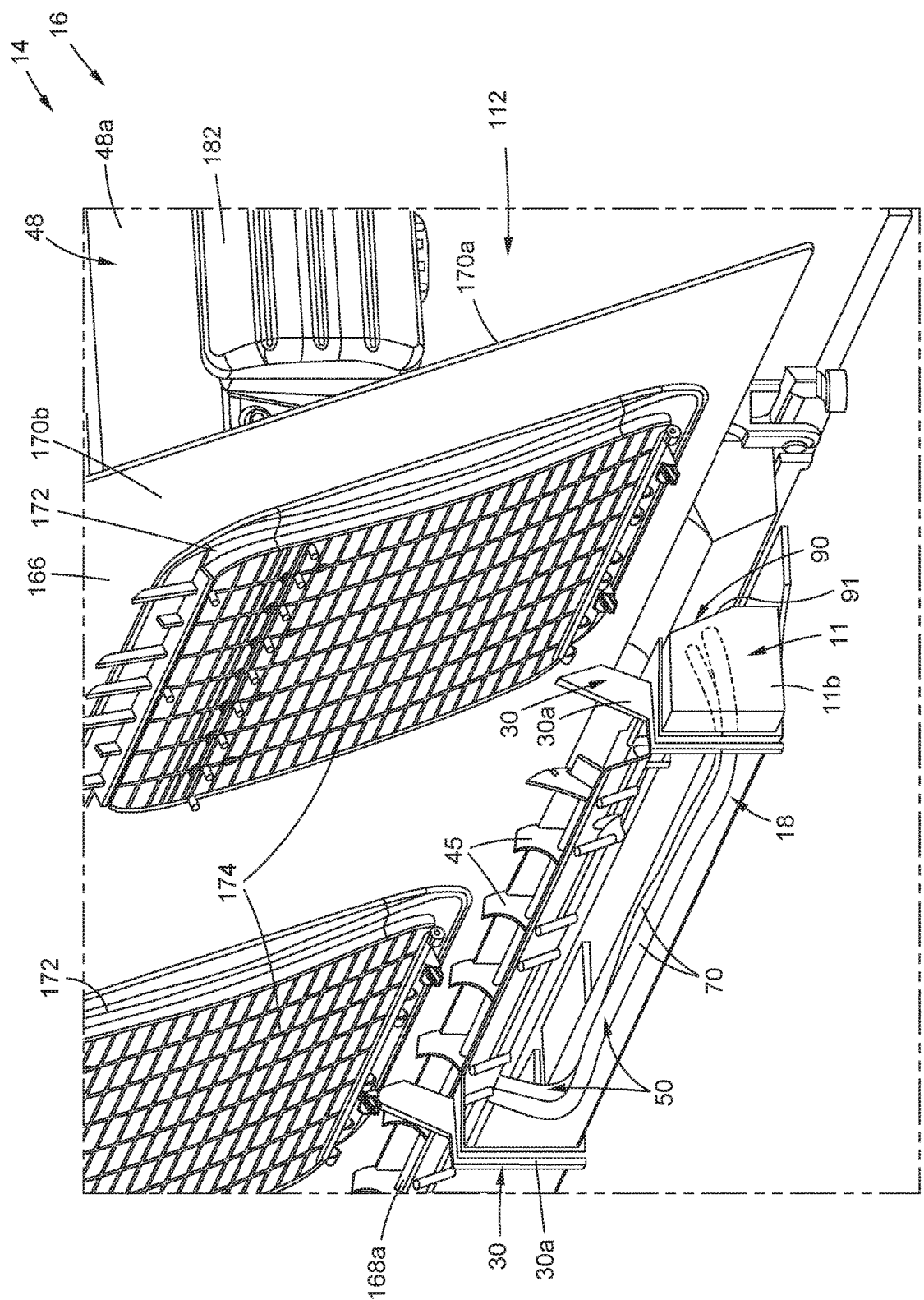
FIG. 9C is an illustration of a perspective back side view of another version of a sidewall closeout area cartridge system of the disclosure.

Now referring to FIG. 9C, FIG. 9C is an illustration of a perspective back side view of another version of a sidewall closeout area cartridge system 11, such as in the form of an enclosed sidewall closeout area cartridge system 11b, of the disclosure. FIG. 9C shows attachment elements 30, such as in the form of brackets 30a, coupled to each end of the raceway 18 of the sidewall closeout area cartridge system 11, such as in the form of an enclosed sidewall closeout area cartridge system 11b. The plurality of conductive elements 50 (see FIG. 9C), such as in the form of the plurality of electrical runs 70 (see FIG. 9C), are routed along the raceway 18 of the sidewall closeout area cartridge system 11, such as in the form of an enclosed sidewall closeout area cartridge system 11b. FIG. 9C shows a raceway cover surface 91 of the raceway cover 90.

As shown in FIG. 9C, the sidewall closeout area cartridge system 11, such as in the form of an enclosed sidewall closeout area cartridge system 11b, is coupled, or attached, to the bottom end 168a of the air grille panel 166 in the cabin 48, such as the passenger cabin 48a, of the vehicle 14, such as the aircraft 16. FIG. 9C shows the interior side 170a, the exterior side 170b, the air grille openings 172, and the air grilles 174 of the air grille panel 166, and shows the fin portions 45 of the raceway 18 contacting the air grille panel 166. The interior side 170a of the air grille panel 166 faces the interior 112 of the cabin 48. FIG. 9C further shows a seat 182 in the interior 112 of the cabin 48.

Figure 10A:
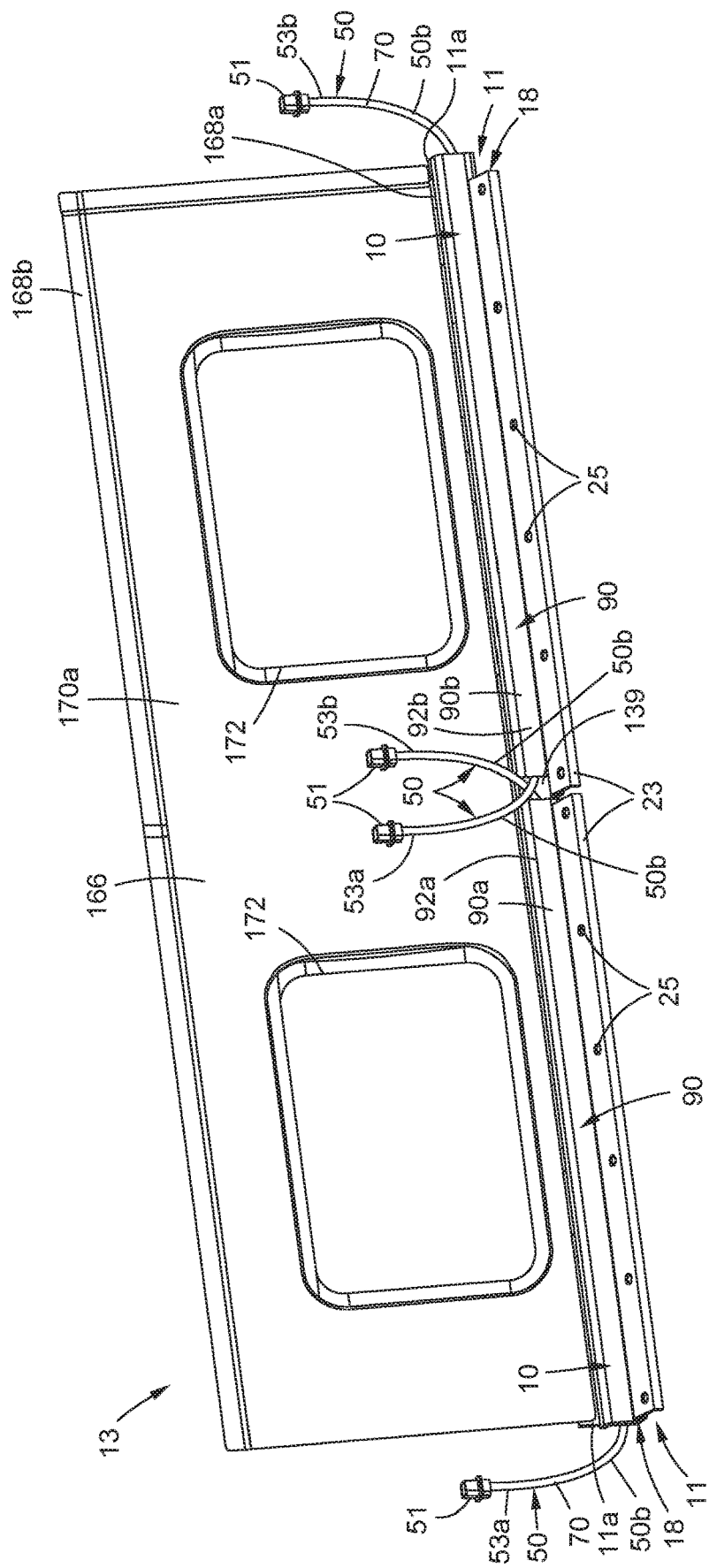
FIG. 10A is an illustration of a perspective side view of a version of an air grille panel cartridge assembly of the disclosure, including a plurality of sidewall closeout area cartridge systems attached to an air grille panel.
Figure 10B:
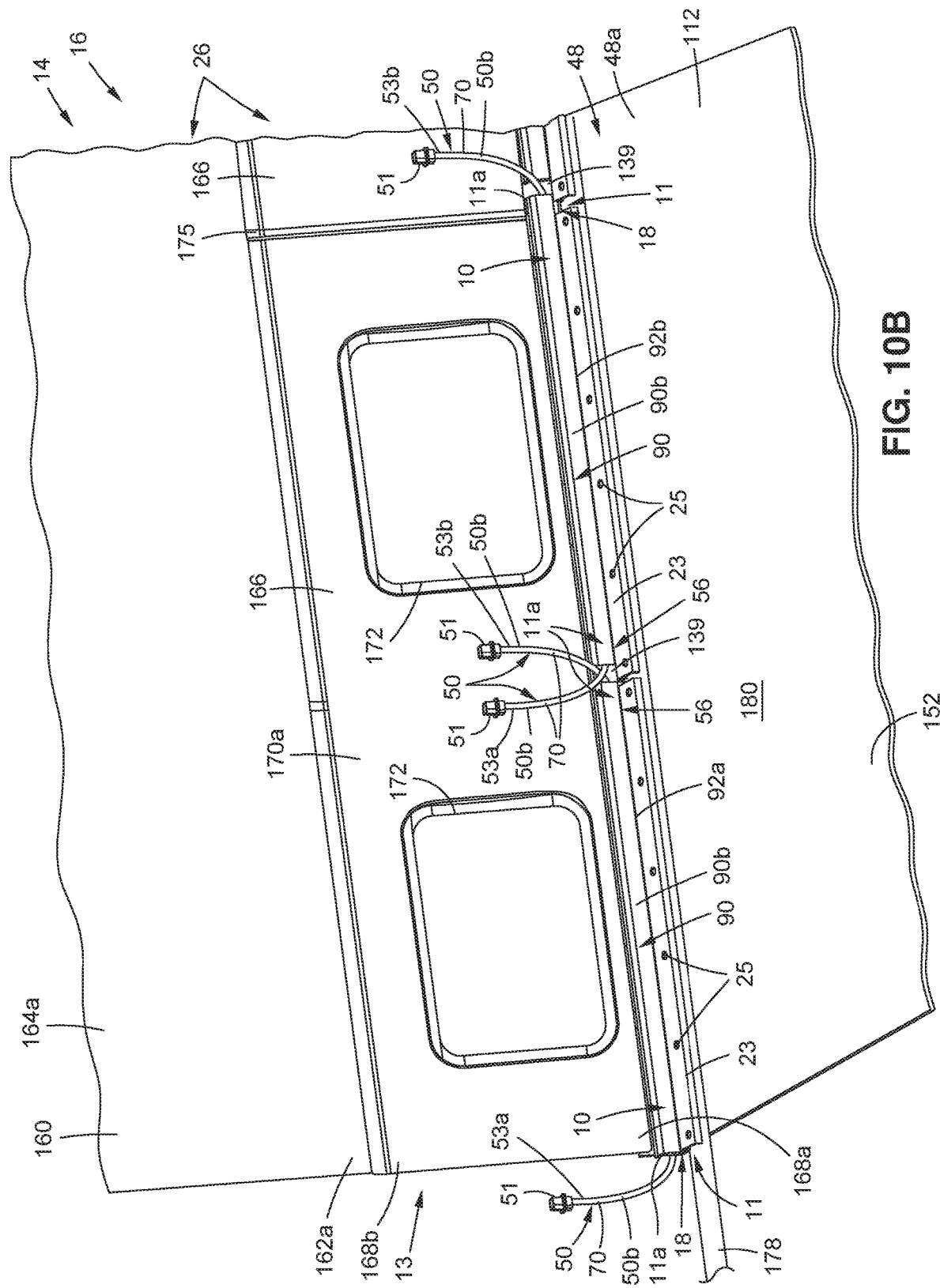
FIG. 10B is an illustration of a perspective side view of the air grille panel cartridge assembly of FIG. 10A attached to a sidewall panel.

Now referring to FIGS. 10A-10B, FIG. 10A is an illustration of a perspective side view of a version of an air grille panel cartridge assembly 13 of the disclosure, including a plurality of sidewall closeout area cartridge systems 11a, such as two sidewall closeout area cartridge systems 11, attached to the bottom end 168a of the air grille panel 166, and FIG. 10B is an illustration of a perspective side view of the air grille panel cartridge assembly 13 of FIG. 10A attached to a bottom end 162a of a sidewall panel 160, and installed in an interior 112 of a cabin 48, such as a passenger cabin 48a, of a vehicle 14, such as an aircraft 16.

As shown in FIGS. 10A-10B, each sidewall closeout area cartridge system 11 comprises the raceway cover assembly 10 coupled, or attached, to the raceway 18. Each raceway cover assembly 10 (see FIGS. 10A-10B) comprises the raceway cover 90 (see FIGS. 10A-10B) retaining the conductive element 50 (see FIGS. 10A-10B). As shown in FIGS. 10A-10B, the raceway covers 90 include the first raceway cover 90a, such as in the form of the first snap-in raceway cover 92a, and the second raceway cover 90b, such as in the form of the second snap-in raceway cover 92b. Each raceway cover 90 (see FIGS. 10A-10B) retains the conductive element 50 (see FIGS. 10A-10B), such as the short length conductive element 50b (see FIGS. 10A-10B), for example, the electrical run 70 (see FIGS. 10A-10B). Each conductive element 50 (see FIGS. 10A-10B) has the connector portions 51 (see FIGS. 10A-10B), and has the first end 53a (see FIGS. 10A-10B) and the second end 53b (see FIGS. 10A-10B). Although FIGS. 10A-10B show the conductive element 50 comprising the electrical run 70, the conductive element 50 may also comprise, as shown in FIG. 1A, one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, power runs 72, data runs 74, lighting system runs 76, and seat system runs 78, including in-flight entertainment (IFE) system runs 80, seat actuation runs 82, personal electronic device (PED) runs 84, one or more systems transport elements 85 comprising one or more of, pneumatic lines 85a, air lines 85b, fluid lines 85c, water lines 85d, or other suitable systems transport elements 85, or another suitable conductive element.

The loose ends of the short length conductive elements 50b (see FIG. 10B), with the connector portions 51 (see FIG. 10B), may be routed to an aircraft floor structure 32 (see FIG. 1B) comprising the fore-aft longitudinal floor grid structure 176 (see FIG. 1B), comprising the longitudinal seat track 178 (see FIG. 1B) and to the seats 182 (see FIG. 1B), comprising the floor panel 180 (see FIG. 10B), or another suitable aircraft floor structure, or may be routed to another area of the interior 112 (see FIG. 10B) of the cabin 48 (see FIG. 10B) of the vehicle 14 (see FIG. 10B), such as the aircraft 16 (see FIG. 10B). In addition, any loose ends of conductive elements 50 from the back of the sidewall closeout area cartridge systems 11 may be connected to an electrical disconnect bracket (not shown) or for each sidewall closeout area cartridge system 11 itself, it may have an integrated connector (not shown), such that when structurally installing it, it would also be electrically connected.

As further shown in FIGS. 10A-10B, the raceway 18 has the raceway track portion 23 with openings 25, and an intermittent routing breakout 139 is formed between the two raceway cover assemblies 10. FIG. 10A further shows the top end 168b, the interior side 170a, and the air grille openings 172 of the air grille panel 166. FIG. 10B further shows the interior side 170a and the air grille openings 172 of the air grille panel 166, the gap 175 between air grille panels 166, and the interior side 164a of the sidewall panel 160.

Figure 11A:
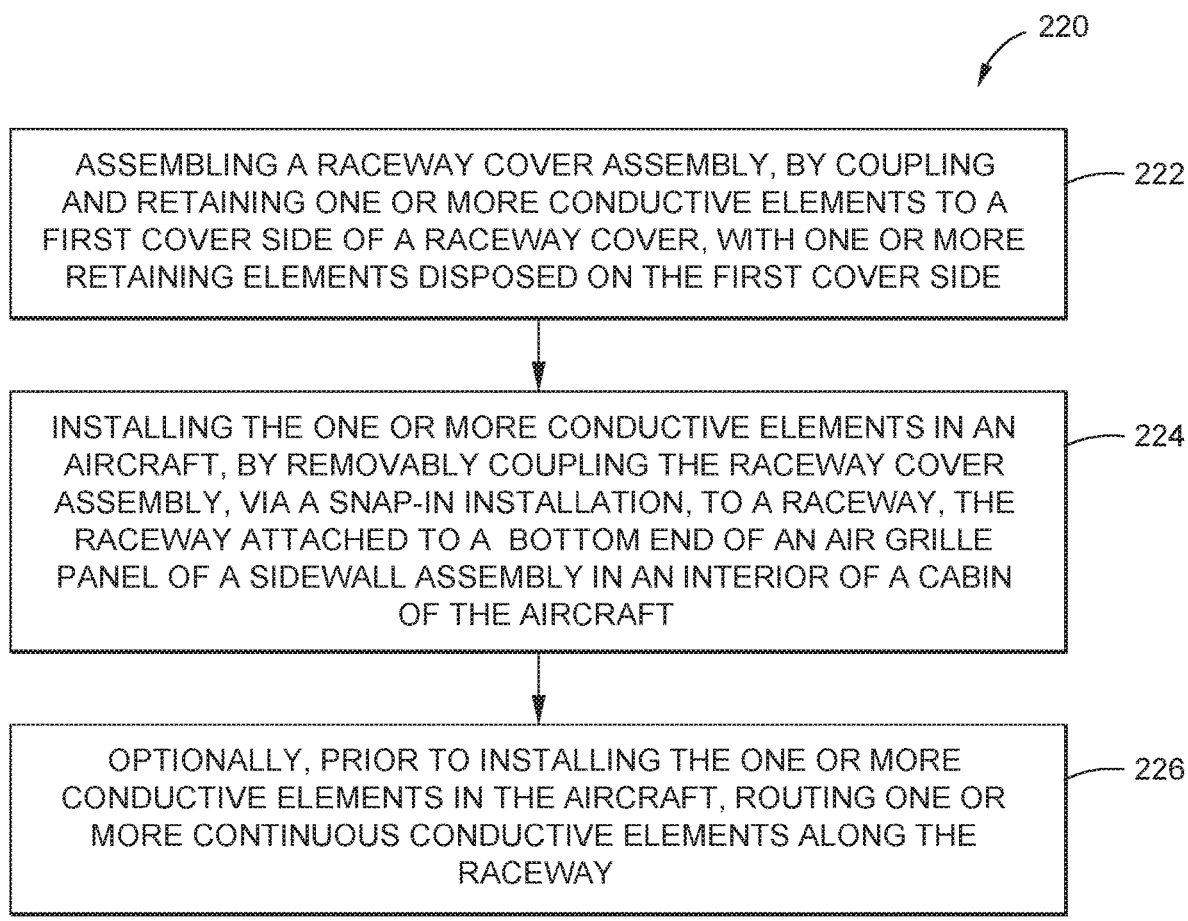
FIG. 11A is an illustration of a flow diagram of a version of a method of the disclosure.

Now referring to FIG. 11A, FIG. 11A is an illustration of a flow diagram of a version of a method 220 of the disclosure. In another version of the disclosure, there is provided the method 220 (see FIG. 11A) for installing one or more conductive elements 50 (see FIG. 1A) in a vehicle 14 (see FIG. 1B), such as an aircraft 16 (see FIG. 1B).

The blocks in FIG. 11A represent operations and/or portions thereof, or elements, and lines connecting the various blocks do not imply any particular order or dependency of the operations or portions thereof, or elements. FIG. 11A and the disclosure of the steps of the method 220 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 11A, the method 220 comprises the step of assembling 222 a raceway cover assembly 10 (see FIGS. 1A, 4A-4B), by coupling and retaining the one or more conductive elements 50 (see FIGS. 1A, 4A) to a first cover side 108 (see FIGS. 1A, 4A, 4C) of a raceway cover 90 (see FIGS. 1A, 4A), such as a snap-in raceway cover 92 (see FIGS. 1A, 4A-4B), with one or more retaining elements 95 (see FIGS. 1A, 4A, 4C) disposed on the first cover side 108.

As shown in FIG. 11A, the method 220 further comprises the step of installing 224 the one or more conductive elements 50 in the vehicle, such as the aircraft 16, by removably coupling the raceway cover assembly 10 (see FIGS. 1A, 4A-4B), via a snap-in installation 94 (see FIGS. 1A, 7), to a raceway 18 (see FIGS. 1A, 7), where the raceway 18 is attached to a bottom end 168a (see FIG. 7) of an air grille panel 166 (see FIG. 7) of a sidewall assembly 26 (see FIGS. 1B, 3A-3B) in an interior 112 (see FIGS. 1B, 3A-3B) of a cabin 48 (see FIGS. 1B, 3A-3B), such as a passenger cabin 48a (see FIGS. 1B, 3A-3B) of the vehicle 14 (see FIGS. 1B, 3A-3B), such as the aircraft 16 (see FIGS. 1B, 3A-3B). When the raceway cover 90 is coupled, or attached, to the raceway 18, the one or more conductive elements 50 are housed and protected.

The raceway cover assembly 10 (see FIGS. 1A, 4A-4B) is assembled at a location 200 (see FIG. 1) off of the vehicle 14, such as the aircraft 16, prior to the snap-in installation 94

(see FIGS. 1A, 7) of the raceway cover assembly 10 to the raceway 18 (see FIGS. 1A, 7). This allows for routing of the one or more conductive elements 50 (see FIGS. 1A, 4A-4B) in the raceway cover 90 (see FIGS. 1A, 4A-4B) at the location 200 off of the vehicle 14, such as the aircraft 16. As shown in FIGS. 1A-1B, the location 200 may comprise an assembly plant 202, a production facility 204, a work station 206, a work bench 208, or another suitable location off of the vehicle 14, such as the aircraft 16.

The step of assembling 222 (see FIG. 11A) the raceway cover assembly 10 may further comprise, assembling 222 a plurality of raceway cover assemblies 10a (see FIGS. 1A, 6B-6C), and the step of installing 224 (see FIG. 11A) the one or more conductive elements 50 in the vehicle 14, such as the aircraft 16, may further comprise, installing 224 the plurality of raceway cover assemblies 10a in a longitudinal fore-aft alignment 56 (see FIGS. 6B-6C) along the raceway 18 (see FIGS. 6B-6C), with intermittent routing breakouts 139 (see FIGS. 6B-6C) formed between each of two of the plurality of raceway cover assemblies 10a. The raceway cover assembly 10 and the raceway 18 assembled together and installed in the vehicle 14, such as in the aircraft 16, create or form the sidewall closeout area assembly 12 (see FIGS. 1B, 3B), which facilitates accessibility to the one or more conductive elements 50, and provides a routing path 86 (see FIG. 1A) for the one or more conductive elements 50 that does not need to be reconfigured for different aircraft cabin layouts 87 (see FIG. 1A).

As shown in FIG. 11A, prior to the step of installing 224 the one or more conductive elements 50 in the vehicle 14, such as the aircraft 16, the method 220 further optionally comprises the step of routing 226 one or more continuous conductive elements 50a (see FIGS. 1A, 5) along the raceway 18 (see FIGS. 1A, 5). The one or more continuous conductive elements 50a may be further routed through one or more access openings 40 (see FIGS. 1A, 8A) in the raceway 18 (see FIGS. 1A, 8A), to access one or more of, a crown area 46 (see FIG. 1B) above the cabin 48 (see FIG. 1B), and an underfloor area 52 (see FIG. 1B) below the cabin 48.

As discussed above, the raceway cover 90 (see FIGS. 4A-4B) retains the conductive element 50 (see FIGS. 4A-4B), such as a short length conductive element 50b (see FIGS. 4A-4B), for example, an electrical run 70 (see FIGS. 4A-4B). The conductive element 50 (see FIG. 4A) has the connector portion 51 (see FIG. 4A) at the first end 53a (see FIG. 4A) and the second end 53b (see FIG. 4A) of the conductive element 50. The conductive element 50 may also comprise, as shown in FIG. 1A, one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, power runs 72, data runs 74, lighting system runs 76, and seat system runs 78, including in-flight entertainment (IFE) system runs 80, seat actuation runs 82, personal electronic device (PED) runs 84, one or more systems transport elements 85 comprising one or more of, pneumatic lines 85a, air lines 85b, fluid lines 85c, water lines 85d, or other suitable systems transport elements, or another suitable conductive element.

The one or more conductive elements 50 (see FIG. 4B), such as the one or more short length conductive elements 50b (see FIG. 4B), and the raceway cover 90 (see FIG. 4B) are preferably assembled together off of the vehicle 14, such as the aircraft 16, to form the raceway cover assembly 10 (see FIG. 4B), and multiple conductive elements 50 may be assembled with multiple raceway covers 90, to form a plurality of raceway cover assemblies 10a (see FIG. 1A). In one version, the raceway cover assembly 10, or the plurality of raceway cover assemblies 10a, are removably coupled to the raceway 18 on the vehicle 14, such as the aircraft 16, where the raceway 18 is attached to one or more air grille panels 166, and one or more continuous conductive elements 50a (see FIG. 1A) may be routed along the raceway 18.

Figure 11B:
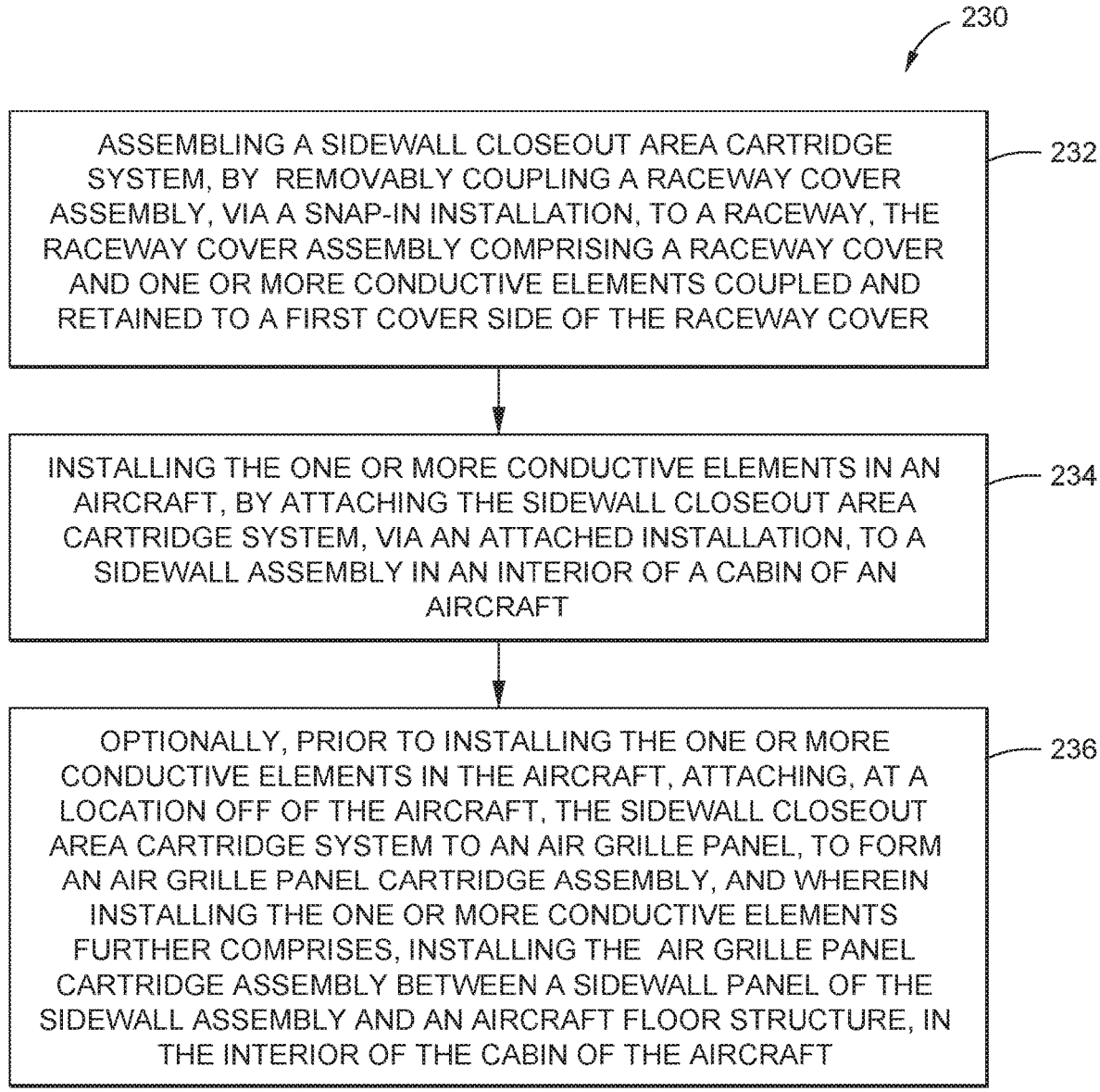
FIG. 11B is an illustration of a flow diagram of another version of a method of the disclosure.

Now referring to FIG. 11B, FIG. 11B is an illustration of a flow diagram of another version of a method 230 of the disclosure. In another version of the disclosure, there is provided the method 230 (see FIG. 11B) for installing one or more conductive elements 50 (see FIG. 1A) in a vehicle 14 (see FIG. 1B), such as an aircraft 16 (see FIG. 1B).

The blocks in FIG. 11B represent operations and/or portions thereof, or elements, and lines connecting the various blocks do not imply any particular order or dependency of the operations or portions thereof, or elements. FIG. 11B and the disclosure of the steps of the method 230 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 11B, the method 230 comprises the step of assembling 232 a sidewall closeout area cartridge system 11 (see FIGS. 1B, 9A-9B), by removably coupling a raceway cover assembly 10 (see FIGS. 1B, 9A-9B), via a snap-in installation 94 (see FIG. 9A), to a raceway 18 (see FIGS. 1B, 9A-9B). As discussed in detail above, the raceway cover assembly 10 (see FIGS. 1A, 9A-9B) comprises a raceway cover 90 (see FIGS. 1A, 9A-9B), such as a snap-in raceway cover 92 (see FIGS. 1A, 9A-9B), having a first cover side 108 (see FIGS. 1A, 9A) facing an interior side 19a (see FIGS. 1A, 9A) of the raceway 18, a second cover side 110 (see FIGS. 1A, 9A) configured to face, and facing, an interior 112 (see FIGS. 1B, 10B) of a cabin 48 (see FIGS. 1B, 10B), such as a passenger cabin 48a (see FIGS. 1B, 10B), of the vehicle 14 (see FIGS. 1B, 10B), such as the aircraft 16 (see FIGS. 1B, 10B), and one or more retaining elements 95 (see FIGS. 4A, 4C) disposed on the first cover side 108 (see FIGS. 4A, 4C).

As discussed in detail above, the raceway cover assembly 10 (see FIGS. 1A, 9A-9B) further comprises the one or more conductive elements 50 (see FIGS. 1A, 9A-9B) coupled and retained to the first cover side 108 (see FIG. 9A), with the one or more retaining elements 95 (see FIGS. 1A, 4A). As discussed above, the raceway cover 90 (see FIGS. 9A-9B) retains the conductive element 50 (see FIGS. 9A-9B), such as a short length conductive element 50b (see FIGS. 9A-9B), for example, an electrical run 70 (see FIGS. 9A-9B). The conductive element 50 (see FIGS. 9A-9B) has the connector portion 51 (see FIGS. 9A-9B) at the first end 53a (see FIGS. 9A-9B) and the second end 53b (see FIGS. 9A-9B) of the conductive element 50. The conductive element 50 may also comprise, as shown in FIG. 1A, one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, power runs 72, data runs 74, lighting system runs 76, and seat system runs 78, including in-flight entertainment (IFE) system runs 80, seat actuation runs 82, personal electronic device (PED) runs 84, one or more systems transport elements 85 comprising one or more of, pneumatic lines 85a, air lines 85b, fluid lines 85c, water lines 85d, or other suitable systems transport elements, or another suitable conductive element.

As shown in FIG. 11B, the method 230 further comprises the step of installing 234 the one or more conductive elements 50 in the vehicle 14, such as the aircraft 16, by attaching the sidewall closeout area cartridge system 11 (see FIGS. 9A-9B), via an attached installation 198 (see FIG. 1B), to a sidewall assembly 26 (see FIG. 1B) in the interior 112 (see FIG. 1B) of the cabin 48 (see FIG. 1B), such as the passenger cabin 48a (see FIG. 1B), of the vehicle 14 (see FIG. 1B), such as the aircraft 16 (see FIG. 1B).

The sidewall closeout area cartridge system 11 (see FIGS. 9A-9B) is assembled at a location 200 (see FIG. 1B) off of the vehicle 14 (see FIG. 1B), such as the aircraft 16 (see FIG. 1B), prior to the attached installation 198 (see FIG. 1B) of the sidewall closeout area cartridge system 11 to the sidewall assembly 26 (see FIG. 1B). This allows for routing of the one or more conductive elements 50 (see FIG. 1A) in the sidewall closeout area cartridge system 11 at the location 200 off of the vehicle 14, such as the aircraft 16.

The step of assembling 232 (see FIG. 11B) the sidewall closeout area cartridge system 11 (see FIGS. 9A-9B) may further comprise, assembling 232 a plurality of sidewall closeout area cartridge systems 11a (see FIGS. 1B, 10B), and the step of installing 234 (see FIG. 11B) the one or more conductive elements 50 in the vehicle 14, such as the aircraft 16, may further comprise, installing 234 the plurality of sidewall closeout area cartridge systems 11a in a longitudinal fore-aft alignment 56 (see FIGS. 1A, 10B) along a bottom end 168a (see FIG. 10B) of an air grille panel 166 (see FIGS. 1A, 10B) of the sidewall assembly 26 (see FIGS. 1B, 10B), with intermittent routing breakouts 139 (see FIGS. 1A, 10B) formed between each of two of the plurality of sidewall closeout area cartridge systems 11a.

The step of installing 234 (see FIG. 11B) the one or more conductive elements 50 in the vehicle 14, such as the aircraft 16, may further comprise, installing 234 the one or more conductive elements 50, by attaching the sidewall closeout area cartridge system 11 (see FIGS. 9A-9B), via the attached installation 198 (see FIG. 1B), with one or more attachment elements 30 (see FIG. 9C), such as one or more brackets 30a (see FIG. 9C), to a bottom end 168a (see FIG. 9C) of an air grille panel 166 (see FIG. 9C) of a sidewall assembly 26 (see FIG. 1B) in the interior 112 (see FIG. 9C) of the cabin 48 (see FIG. 9C), such as the passenger cabin 48a (see FIG. 9C), of the vehicle 14 (see FIG. 9C), such as the aircraft 16 (see FIG. 9C). The sidewall assembly 26 (see FIG. 1B) comprises one or more sidewall panels 160 (see FIG. 1B) coupled to one or more air grille panels 166 (see FIG. 1B), and the first end 20 (see FIG. 1A) of the raceway 18 (see FIGS. 1A-1B) is configured to attach, and attaches, to a bottom end 168a (see FIG. 1B) of each of the air grille panels 166 of the sidewall assembly 26. The second end 21 (see FIG. 1A) of the raceway 18 is configured to attach, and attaches, to the one or more aircraft floor structures 32 (see FIG. 1B) comprising one or more of, a fore-aft longitudinal floor grid structure 176 (see FIG. 1B), a longitudinal seat track 178 (see FIG. 1B), a floor panel 180 (see FIG. 1B) of the floor 152 (see FIG. 1B), or another suitable aircraft floor structure.

As shown in FIG. 11B, prior to the step of installing 234 the one or more conductive elements 50 in the vehicle 14, such as the aircraft 16, the method 230 may further optionally comprise the step of attaching 236, at the location 200 (see FIG. 1B) off of the vehicle 14, such as the aircraft 16, the sidewall closeout area cartridge system 11 (see FIGS. 9A-9B, 10A) to an air grille panel 166 (see FIGS. 1B, 10A), to form an air grille panel cartridge assembly 13 (see FIGS. 1B, 10A), and wherein the step of installing 234 (see FIG. 11B) the one or more conductive elements 50 further comprises, installing the air grille panel cartridge assembly 13 (see FIG. 10B) between a sidewall panel 160 (see FIG. 10B) of the sidewall assembly 26 (see FIGS. 1B, 3A) and an aircraft floor structure 32 (see FIGS. 1B, 3A), such as the floor 152 (see FIGS. 1B, 10B), in the interior 112 (see FIGS. 1B, 3A, 10B) of the cabin 48 (see FIGS. 1B, 3A, 10B), such as the passenger cabin 48a (see FIGS. 1B, 3A, 10B), of the vehicle 14, such as the aircraft 16.

The one or more conductive elements 50 (see FIG. 4B), such as the one or more short length conductive elements 50b (see FIG. 4B), and the raceway cover 90 (see FIG. 4B) are preferably assembled together off of the vehicle 14, such as the aircraft 16, to form the raceway cover assembly 10 (see FIG. 4B), and multiple conductive elements 50 may be assembled with multiple raceway covers 90, to form a plurality of raceway cover assemblies 10a (see FIG. 1A). In one version, as discussed above, the raceway cover assembly 10, or the plurality of raceway cover assemblies 10a, are removably coupled to the raceway 18 on the vehicle 14, such as the aircraft 16, where the raceway 18 is attached to one or more air grille panels 166, and one or more continuous conductive elements 50a (see FIG. 1A) may be routed along the raceway 18.

In another version, the raceway cover assembly 10, or the plurality of raceway cover assemblies 10a, are removably coupled to the raceway 18 off of the vehicle 14, such as the aircraft 16, to form the sidewall closeout area cartridge system 11 (see FIG. 1B, 9B) or a plurality of sidewall closeout area cartridge systems 11a (see FIG. 1B), and the sidewall closeout area cartridge system 11 (see FIG. 1B, 9B) or the plurality of sidewall closeout area cartridge systems 11a, are preferably attached on the vehicle 14, such as the aircraft 16, to the sidewall panel 160 (see FIG. 10B) of the sidewall assembly 26 (see FIGS. 1B, 10B).

Figure 12:
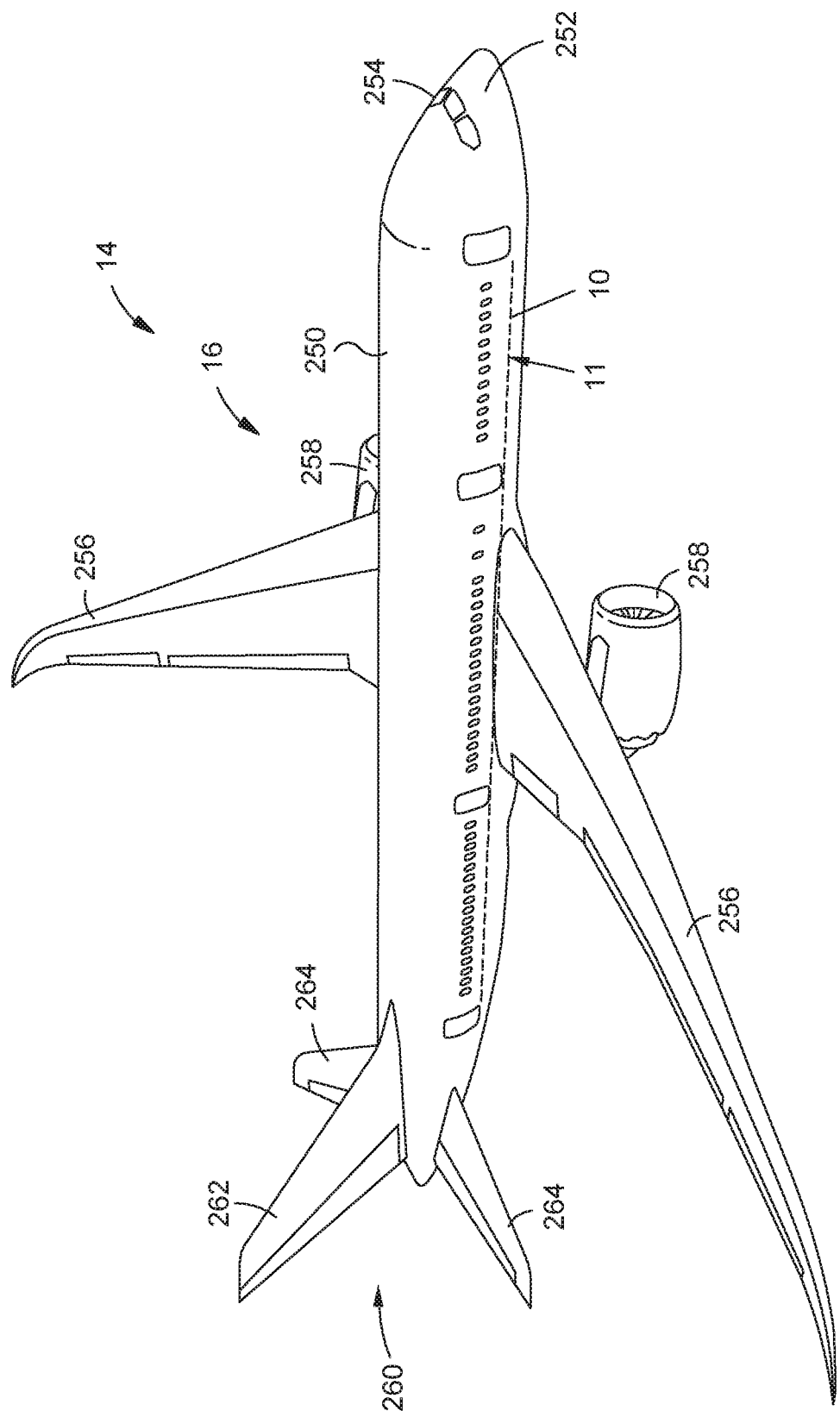
FIG. 12 is an illustration of a perspective view of an aircraft that incorporates a version of a raceway cover assembly of the disclosure.

Now referring to FIG. 12, FIG. 12 is a diagrammatic representation of a perspective view of a vehicle 14, such as in the form of an aircraft 16, that incorporates a version of the sidewall closeout area cartridge system 11 with a version of the raceway cover assembly 10, of the disclosure. As further shown in FIG. 12, the vehicle 14, such as in the form of aircraft 16, comprises a fuselage 250, a nose 252, a cockpit 254, wings 256, engines 258, and an empennage 260 comprising a vertical stabilizer 262 and horizontal stabilizers 264. Although the vehicle 14, such as the aircraft 16, shown in FIG. 12 is generally representative of a commercial passenger aircraft having a version of the sidewall closeout area cartridge system 11 with a version of the raceway cover assembly 10, the teachings of the disclosed versions and examples may be applied to other vehicles. For example, the teachings of the disclosed versions and examples may be applied to cargo aircraft, military aircraft, rotorcraft, and other types of aircraft or air vehicles. In addition, the teachings of the disclosed versions and examples may be applied to boats 15 (see FIG. 1B), trains 17 (see FIG. 1B), and other passenger carrying vehicles. In addition, the teachings of the disclosed versions and examples may be applied to structures where a highly reconfigurable conduit is required, for example, commercial and home conduit replacement, floor molding replacement, cubicle configuration, configuration of booths such as at trade shows, and other suitable structures.

Figure 13:
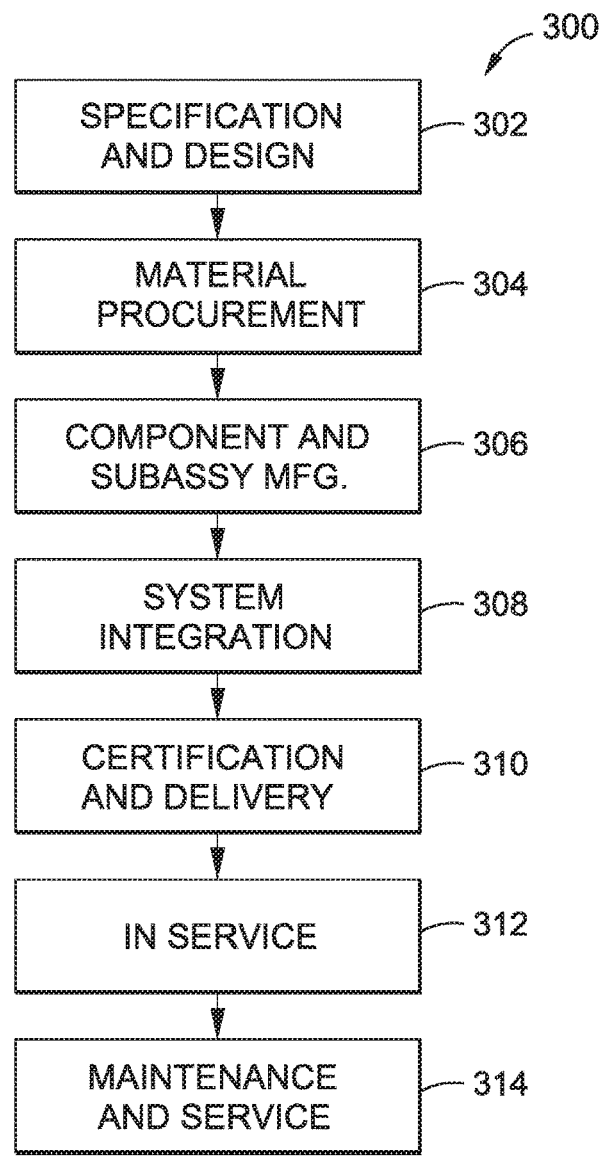
FIG. 13 is an illustration of a flow diagram of an exemplary aircraft manufacturing and service method.
Figure 14:
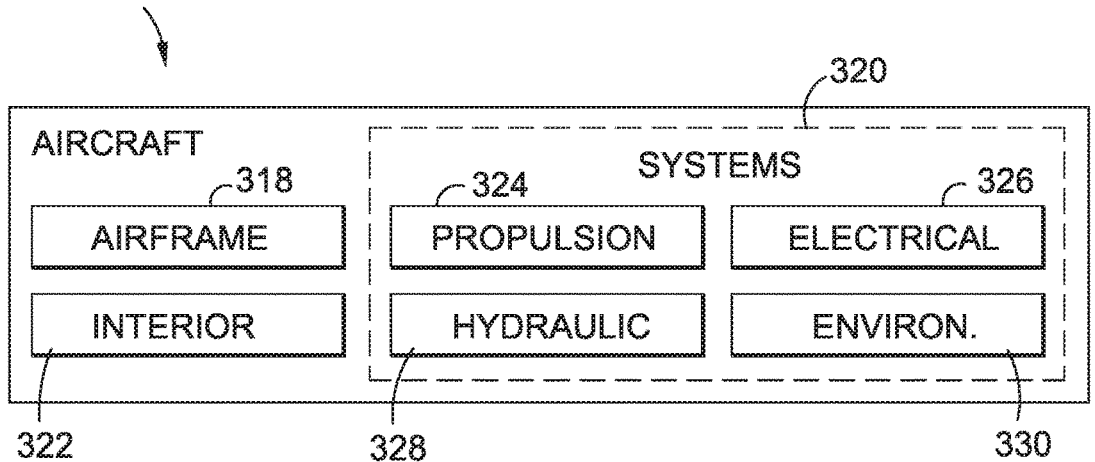
FIG. 14 is an illustration of an exemplary block diagram of an aircraft.

Now referring to FIGS. 13 and 14, FIG. 13 is an illustration of a flow diagram of an exemplary aircraft manufacturing and service method 300, and FIG. 14 is an illustration of an exemplary block diagram of an aircraft 316. Referring to FIGS. 13 and 14, versions of the disclosure may be described in the context of the aircraft manufacturing and service method 300 as shown in FIG. 13, and the aircraft 316 as shown in FIG. 14.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 14, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatuses, methods, or a combination thereof, may be utilized during component and subassembly manufacturing 306 and system integration 308, for example, by substantially expediting assembly of or reducing the cost of the aircraft 316. Similarly, one or more of apparatuses, methods, or a combination thereof, may be utilized while the aircraft 316 is in service 312, for example and without limitation, to maintenance and service 314.

Disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) provide for an assembly, a system, and methods for installing one or more conductive elements 50 (see FIG. 1A), such as electrical runs 70 (see FIG. 1A), system transport elements 85 (see FIG. 1A), or other suitable conductive elements in an interior 112 (see FIG. 1B) of a cabin 48 (see FIG. 1B), such as a passenger cabin 48a (see FIG. 1B), of a vehicle 14 (see FIG. 1B), such as an aircraft 16 (see FIG. 1B), a boat 15 (see FIG. 1B), a train 17 (see FIG. 1B), or another passenger carrying vehicle, and streamline the installation process on the vehicle 14 by not requiring any routing of the one or more conductive elements 50. Disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) allow for the consolidation of conductive elements 50, for example, wires 60 (see FIG. 1A), cables 62 (see FIG. 1A), pneumatic lines 85a (see FIG. 1A), fluid lines 85c (see FIG. 1A), and other suitable conductive elements, into a higher level assembly that takes less time to install than installing the conductive elements 50 independently in the vehicle 14, such as the aircraft 16, and reduce the installation critical path by the installation time of the conductive elements 50 into the conduit, such as the raceway cover assembly 10, by pre-installing them. The method 220 (see FIG. 11A) includes coupling and retaining one or more conductive elements 50 to a raceway cover 90 (see FIG. 1A) at a location 200 (see FIG. 1A) off of the vehicle 14, such as the aircraft 16, to form a raceway cover assembly 10 (see FIG. 1A), and installing the raceway cover assembly 10 in the vehicle 14, such as the aircraft 16, by removably coupling the raceway cover assembly 10, via a snap-in installation 94 (see FIG. 1A), to a raceway 18 (see FIG. 1A) attached to an air grille panel 166 (see FIG. 1B) of a sidewall assembly 26 (see FIG. 1B). The method 230 (see FIG. 11B) includes removably coupling the raceway cover assembly 10 (see FIG. 1A), via the snap-in installation 94 (see FIG. 1A), to a raceway 18 (see FIG. 1A), at a location 200 (see FIG. 1A) off of the vehicle 14, such as the aircraft 16, to form a sidewall closeout area cartridge system 11 (see FIG. 1B), and attaching the sidewall closeout area cartridge system 11, via an attached installation 198 (see FIG. 1B), to the sidewall assembly 26 (see FIG. 1B) in the interior 112 (see FIG. 1B) of the cabin 48 of the vehicle 14, such as the aircraft 16.

In addition, disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) integrate the conductive elements 50, for example, wires 60 (see FIG. 1A), cables 62 (see FIG. 1A), pneumatic lines 85a (see FIG. 1A), fluid lines 85c (see FIG. 1A), and other suitable conductive elements 50, into an assembly or system that may be easily installed in a single step, via a snap-in installation 94 (see FIG. 1A) for the raceway cover assembly 10, or via an attached installation 198 (see FIG. 1B) for the sidewall closeout area cartridge system 11 or for the air grille panel cartridge assembly 13 (see FIG. 1B), on the vehicle 14, such as the aircraft 16. Disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) allow for the installation and integration of the one or more conductive elements 50 in the raceway cover assembly 10 (see FIG. 1A), in the sidewall closeout area cartridge system 11 (see FIG. 1A), or in the air grille panel cartridge assembly 13 (see FIG. 1B), to be performed or conducted off of the vehicle 14, such as the aircraft 16, at a location 200 (see FIGS. 1A-1B) off of the vehicle 14, such as the aircraft 16, for example, at an assembly plant 202 (see FIGS. 1A-1B), at a production facility 204 (see FIGS. 1A-1B), at a work station 206 (see FIGS. 1A-1B), at a work bench 208 (see FIG. 1A-1B), or at another suitable location. The location 200 is preferably optimized for ergonomics and part or tool availability. The one or more conductive elements 50 need only be installed or integrated when required by installation flow and avoid exposed conductive elements 50, such as wires 60 or cables 62, during installation. In addition, since the one or more conductive elements 50 are pre-routed in the conduit, such as in the form of the raceway cover assembly 10, the sidewall closeout area cartridge system 11, or the air grille panel cartridge assembly 13, there is no need to apply secondary protective methods to avoid any possible damage.

Further, having this installation or integration performed at the location 200 off of the vehicle 14, such as the aircraft 16, makes access easier to tools for trimming the raceway cover 90 or the raceway 18 to fit the one or more conductive elements 50, and avoids having to specially protect aircraft decorative surfaces on the aircraft 16 from Foreign Object Debris (FOD) created by trimming. The creation of the raceway cover assembly 10, the sidewall closeout area cartridge system 11, and the air grille panel cartridge assembly 13, itself may be performed in a location 200 (see FIGS. 1A-1B) that is optimized, where tools, parts, and Foreign Object Debris (FOD) collection devices are readily available. The time needed for installers or mechanics to leave the vehicle 14, such as the aircraft 16, to retrieve each independent part or tool is eliminated, so the raceway cover assembly 10, the sidewall closeout area cartridge system 11, and the air grille panel cartridge assembly 13 are assembled more efficiently. Moreover, the location 200 provides an optimized work area that allows an installer or mechanic to sit or stand while performing work, and to use powered tools, such as a saw replacing a knife for cutting or trimming, that may not be available on the vehicle 14, such as the aircraft 16. This may result in a cost savings for production and elimination of variability.

Moreover, disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) allow an installer to pre-load the one or more conductive elements 50 into the raceway cover assembly 10, the sidewall closeout area cartridge system 11, or the air grille panel cartridge assembly 13, and allow for multiple installations to be done simultaneously to reduce production times and to significantly decrease the complexity of the installations. This may result in increased efficiency, increased quality of manufacturing of parts for the vehicle 14, such as the aircraft 16, and overall decreased costs of assembly and manufacturing. This may further result in lightweight aircraft structures that are less complex by reducing congestion of the conductive elements 50 because the raceway cover assembly 10 and the sidewall closeout area cartridge system 11 keep the conductive elements 50 gathered together off the vehicle 14, such as the aircraft 16, prior to installation in the vehicle 14, such as the aircraft 16. The service lengths, or ends of the conductive elements 50, may be stowed out of the way to prevent any potential damage to the conductive elements 50 and connector portions 51 (see FIG. 1A), as well as keep them out of the way to avoid any possible ergonomics issues for people or tooling. Disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) also allow for future installation of the seats 182 (see FIG. 1B) with ease, and enable an installer to pre-assemble parts off of the vehicle 14, such as the aircraft 16, and to avoid the need for outboard seat tracks, seat track covers, and other related parts.

In addition, disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) provide a routing path 86 (see FIG. 1A) that is stable and that does not need to be re-engineered for different aircraft cabin layouts 87 (see FIG. 1A), and provide a modular design 146 (see FIG. 1A) that is configurable and applicable to all possible variation of aircraft layouts. The raceway cover assembly 10 (see FIG. 1A), the sidewall closeout area cartridge system 11 (see FIG. 1B), and the air grille panel cartridge assembly 13 (see FIG. 1B) provide a space where the conductive elements 50 (see FIG. 1A), for example, wires 60 (see FIG. 1A) and cables 62 (see FIG. 1A), will not be damaged by contact from passengers or carry-on freight in the interior 112 (see FIG. 1B) of the cabin 48 (see FIG. 1B) of the vehicle 14, such as the aircraft 16 (see FIG. 1B), and provide an architecture that is easy to install and minimizes or avoids ergonomic issues for installers. The closeout area 142 (see FIG. 1A) between the raceway 18 (see FIG. 1A) and the raceway cover 90 (see FIG. 1A) has a cross-sectional area 144 (see FIG. 1A) that is sufficiently large enough to house and protect the conductive elements 50, and that is sufficiently small enough to provide adequate support, and provides a channel or space in an otherwise unused volume 148 (see FIG. 1A) of the vehicle 14, such as the aircraft 16, and eliminates the need for congestion of wires 60, cables 62, and other conductive elements 50, above the floor 152 (see FIG. 1B) in the cabin 48 (see FIG. 1B). The envelope of the closeout area 142, or channel, is preferably optimized to allow for environmental control system (ECS) constraints, such as air flow, decompression, and the like.

Further, disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) improve the visual appearance of the cabin 48 by eliminating traversing electrical runs, eliminating variability in the floor covering, and eliminating protrusions in the cabin 48. Moreover, disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) provide floor penetration elimination 150 (see FIG. 1A) and remove the need to penetrate the floor 152 of the cabin 48 with holes 151 (see FIG. 2B) to route the conductive elements 50 between main runs located below the floor 152 in the underfloor area 52 (see FIG. 1B), in the cabin 48 (see FIG. 1B), and/or in the crown area 46 (see FIG. 1B), by locating the conductive elements 50, for example, wires 60, cables 62, or other conductive elements, such that they can be accessible and easily routed without interference through aircraft structures. In addition, disclosed versions of the raceway cover assembly 10 (see FIGS. 1A, 4A-4B), the sidewall closeout area cartridge system 11 (see FIGS. 1B, 9A-9B), the air grille panel cartridge assembly 13 (see FIGS. 1B, 10A), the method 220 (see FIG. 11A), and the method 230 (see FIG. 11B) provide for rapid reconfiguration of seats 182, such as palletized seats 182a, at different seat pitches, in the cabin 48, such as the passenger cabin 48a, of the vehicle 14, such as the aircraft 16.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. A raceway cover assembly for installing one or more conductive elements in an aircraft, the raceway cover assembly comprising:
   a raceway cover configured for removable coupling to a raceway, the raceway comprising a first end, a second end, a raceway body extending from the first end, and a raceway track portion extending from the raceway body to the second end, the first end of the raceway configured for one of, direct attachment to, or integration with, a bottom end of an air grille panel of a sidewall assembly in an interior of a cabin of the aircraft, the raceway cover comprising:
      a bottom end with tab members configured to couple to the raceway track portion;
      a top end configured to abut against the raceway body;
      a first cover side configured to face an interior side of the raceway;
      a second cover side configured to face the interior of the cabin; and
      one or more retaining elements disposed on the first cover side; and
   the one or more conductive elements coupled and retained to the first cover side, with the one or more retaining elements, to form the raceway cover assembly,
   wherein the one or more conductive elements and the raceway cover are assembled together at a location off of the aircraft, prior to installation of the raceway cover assembly in the aircraft, which allows for routing of the one or more conductive elements in the raceway cover at the location off of the aircraft.

2. The raceway cover assembly of claim 1, wherein the raceway cover comprises a snap-in raceway cover.

3. The raceway cover assembly of claim 1, wherein the raceway cover assembly is installed in the cabin, via a snap-in installation, to the raceway.

4. The raceway cover assembly of claim 3, wherein one or more continuous conductive elements are routed along the raceway, prior to the raceway cover assembly being installed, via the snap-in installation, to the raceway.

5. The raceway cover assembly of claim 1, wherein at the location off of the aircraft, the raceway cover assembly is removably coupled to the raceway, to form a sidewall closeout area cartridge system, and the sidewall closeout area cartridge system is configured for installation in the cabin of the aircraft between the air grille panel of the sidewall assembly and an aircraft floor structure.

6. The raceway cover assembly of claim 1, wherein at the location off of the aircraft, the raceway cover assembly is removably coupled to the raceway to form a sidewall closeout area cartridge system, and the first end of the raceway of the sidewall closeout area cartridge system is directly attached to, or integrated with, the bottom end of the air grille panel of the sidewall assembly, to form an air grille panel cartridge assembly, and the air grille panel cartridge assembly is configured for installation in the cabin between the air grille panel of the sidewall assembly and an aircraft floor structure.

7. The raceway cover assembly of claim 1, wherein the one or more retaining elements disposed on the first cover side of the raceway cover comprise one or more of, clips, clamps, and hooks.

8. The raceway cover assembly of claim 1, wherein the one or more conductive elements comprise one or more of, wires, cables including electrical cables, data bus cables, high speed transmission cables, coaxial cables, and fiber optic cables, printed circuit boards (PCBs), tubes, and capacitors.

9. The raceway cover assembly of claim 1, wherein the one or more conductive elements comprise one or more electrical runs comprising one or more of, power runs, data runs, lighting system runs, and seat system runs including in-flight entertainment (IFE) system runs, seat actuation runs, and personal electronic device (PED) runs, and comprise one or more systems transport elements comprising one or more of, pneumatic lines, air lines, fluid lines, and water lines.

10. A sidewall closeout area cartridge system for installing one or more conductive elements in an aircraft, the sidewall closeout area cartridge system comprising:
    a raceway comprising a first end, a second end, a raceway body extending from the first end, and a raceway track portion extending from the raceway body to the second end, the first end of the raceway configured for one of, direct attachment to, or integration with, a bottom end of an air grille panel of a sidewall assembly in an interior of a cabin of the aircraft, and the second end of the raceway configured for attachment to an aircraft floor structure in the aircraft; and
    a raceway cover assembly comprising:
        a raceway cover removably coupled to the raceway, the raceway cover comprising:
            a bottom end with tab members coupled to the raceway track portion;
            a top end abutting against the raceway body;
            a first cover side facing an interior side of the raceway;
            a second cover side configured to face the interior of the cabin; and
            one or more retaining elements disposed on the first cover side; and
        the one or more conductive elements coupled and retained to the first cover side, with the one or more retaining elements,
    wherein the raceway cover assembly and the raceway are assembled together at a location off of the aircraft, to form the sidewall closeout area cartridge system, prior to installation of the sidewall closeout area cartridge system in the aircraft, which allows for routing of the one or more conductive elements in the sidewall closeout area cartridge system at the location off of the aircraft.

11. The sidewall closeout area cartridge system of claim 10, wherein at the location off of the aircraft, the first end of the raceway of the sidewall closeout area cartridge system is directly attached to, or integrated with, the bottom end of the air grille panel of the sidewall assembly, to form an air grille panel cartridge assembly, and the air grille panel cartridge assembly is configured for installation in the cabin between the air grille panel of the sidewall assembly and the aircraft floor structure.

12. The sidewall closeout area cartridge system of claim 10, wherein the one or more conductive elements comprise one or more of, wires, cables including electrical cables, data bus cables, high speed transmission cables, coaxial cables, and fiber optic cables, printed circuit boards (PCBs), tubes, and capacitors.

13. The sidewall closeout area cartridge system of claim 10, wherein the one or more conductive elements comprise one or more electrical runs comprising one or more of, power runs, data runs, lighting system runs, and seat system runs including in-flight entertainment (IFE) system runs, seat actuation runs, and personal electronic device (PED) runs, and comprise one or more systems transport elements comprising one or more of, pneumatic lines, air lines, fluid lines, and water lines.

14. A method for installing one or more conductive elements in an aircraft, the method comprising the steps of:
    assembling a raceway cover assembly comprising:
        a raceway cover configured for removable coupling to a raceway, the raceway comprising a first end, a second end, a raceway body extending from the first end, and a raceway track portion extending from the raceway body to the second end, the raceway cover comprising:
            a bottom end with tab members coupled to the raceway track portion;
            a top end abutting against the raceway body;
            a first cover side facing an interior side of the raceway;
            a second cover side configured to face an interior of a cabin of the aircraft; and
            one or more retaining elements disposed on the first cover side;
    coupling and retaining the one or more conductive elements to the first cover side of the raceway cover, with the one or more retaining elements; and
    installing the one or more conductive elements in the aircraft, by removably coupling the raceway cover assembly, via a snap-in installation, to the raceway, wherein the first end of the raceway is one of, directly attached to, or integrated with, a bottom end of an air grille panel of a sidewall assembly in the interior of the cabin of the aircraft, and the second end of the raceway is attached to an aircraft floor structure in the aircraft,
    wherein the raceway cover assembly is assembled at a location off of the aircraft, prior to the snap-in installation of the raceway cover assembly to the raceway, which allows for routing of the one or more conductive elements in the raceway cover at the location off of the aircraft.

15. The method of claim 14, wherein prior to installing the one or more conductive elements in the aircraft, routing one or more continuous conductive elements along the raceway.

16. The method of claim 14, wherein assembling the raceway cover assembly further comprises, assembling a plurality of raceway cover assemblies, and wherein installing the one or more conductive elements in the aircraft further comprises, installing the plurality of raceway cover assemblies in a longitudinal fore-aft alignment along the raceway, with intermittent routing breakouts formed between each of two of the plurality of raceway cover assemblies.

17. A method for installing one or more conductive elements in an aircraft, the method comprising the steps of:
    assembling a sidewall closeout area cartridge system comprising:
        a raceway comprising a first end, a second end, a raceway body extending from the first end, and a raceway track portion extending from the raceway body to the second end; and
        a raceway cover assembly comprising:
            a raceway cover removably coupled to the raceway, the raceway cover comprising:
                a bottom end with tab members coupled to the raceway track portion;
                a top end abutting against the raceway body;
                a first cover side facing an interior side of the raceway;
                a second cover side configured to face an interior of a cabin of the aircraft; and
                one or more retaining elements disposed on the first cover side;
    coupling and retaining the one or more conductive elements to the first cover side of the raceway cover, with the one or more retaining elements;
    removably coupling the raceway cover assembly, via a snap-in installation, to the raceway; and
    installing the one or more conductive elements in the aircraft, wherein the first end of the raceway has one of, direct attachment to, or integration with, a bottom end of an air grille panel of a sidewall assembly in the interior of the cabin of the aircraft, and the second end of the raceway is attached to an aircraft floor structure in the aircraft,
    wherein the sidewall closeout area cartridge system is assembled at a location off of the aircraft, prior to the attached installation of the sidewall closeout area cartridge system to the sidewall assembly, which allows for routing of the one or more conductive elements in the sidewall closeout area cartridge system at the location off of the aircraft.

18. The method of claim 17, wherein prior to installing the one or more conductive elements in the aircraft, attaching, at the location off of the aircraft, the sidewall closeout area cartridge system to the air grille panel, to form an air grille panel cartridge assembly, and wherein installing the one or more conductive elements further comprises, installing the air grille panel cartridge assembly between the air grille panel of the sidewall assembly and the aircraft floor structure, in the interior of the cabin of the aircraft.

19. The method of claim 17, wherein assembling the sidewall closeout area cartridge system further comprises, assembling a plurality of sidewall closeout area cartridge systems, and wherein installing the one or more conductive elements in the aircraft further comprises, installing the plurality of sidewall closeout area cartridge systems in a longitudinal fore-aft alignment along the bottom end of the air grille panel of the sidewall assembly, with intermittent routing breakouts formed between each of two of the plurality of sidewall closeout area cartridge systems.

20. The method of claim 17, wherein installing the one or more conductive elements in the aircraft further comprises, installing the one or more conductive elements, by the direct attachment of the first end of the raceway, with one or more brackets to the bottom end of the air grille panel of the sidewall assembly in the interior of the cabin of the aircraft.

* * * * *